US011372827B2

(12) United States Patent
Dani et al.

(10) Patent No.: US 11,372,827 B2
(45) Date of Patent: Jun. 28, 2022

(54) RECORD-BY-RECORD LIVE MIGRATION USING A LOCK STORE

(71) Applicant: Amazon Technologies, Inc., Seattle, WA (US)

(72) Inventors: Raghavendra Mohan Dani, Davangere (IN); Ameya Shrinivas Sakhalkar, Pune (IN); Shubham Chaturvedi, Gurgaon (IN); Nikhil Baliga, Bengaluru (IN)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 15/930,332

(22) Filed: May 12, 2020

(65) Prior Publication Data

US 2021/0349863 A1 Nov. 11, 2021

(51) Int. Cl.
*G06F 16/21* (2019.01)
*G06F 16/23* (2019.01)

(52) U.S. Cl.
CPC ........ *G06F 16/214* (2019.01); *G06F 16/2343* (2019.01); *G06F 16/2379* (2019.01)

(58) Field of Classification Search
CPC . G06F 16/214; G06F 16/2379; G06F 16/2343
See application file for complete search history.

(56) References Cited

U.S. PATENT DOCUMENTS

| 8,880,477 | B2 | 11/2014 | Barker et al. |
| 9,792,321 | B2 | 10/2017 | Buehne et al. |
| 9,805,071 | B1 | 10/2017 | Ellis et al. |
| 9,881,035 | B2 | 1/2018 | Engelko et al. |
| 9,927,992 | B2 | 3/2018 | Driesen et al. |
| 9,984,101 | B2 | 5/2018 | Meder |
| 10,185,727 | B1 | 1/2019 | Wilton et al. |
| 10,187,466 | B2 | 1/2019 | Sanderson |
| 10,191,922 | B2 | 1/2019 | Michael et al. |
| 10,268,633 | B2 | 4/2019 | Mohanty et al. |

OTHER PUBLICATIONS

U.S. Appl. No. 16/938,846, filed Jul. 24, 2020, Saravana Perumal, et al., Amazon Technologies, Inc., application pp. 1-49 and drawing pp. 1-12.

(Continued)

*Primary Examiner* — Jay A Morrison
(74) *Attorney, Agent, or Firm* — Robert C. Kowert; Kowert, Hood, Munyon, Rankin & Goetzel, P.C.

(57) ABSTRACT

Methods, systems, and computer-readable media for record-by-record live migration using a lock store are disclosed. Migration of a data set comprises acquiring a migration lock from a lock store for an individual record being migrated. An instance of the record is then stored in the destination, and the record is deleted from the source. Subsequently, the migration lock is deleted from the lock store or otherwise released. During the migration, a rate at which insert requests are directed to the destination is dialed up. During the process of updating an insert treatment configuration across a distributed set of migration router instances, an insert lock is acquired from the lock store for each record being inserted. Also metadata is stored indicating a determined location for the record being inserted. Any subsequent requests to insert a record with a same key are inserted at the indicated determined location.

20 Claims, 27 Drawing Sheets

(56) References Cited

OTHER PUBLICATIONS

U.S. Appl. No. 16/401,039, filed May 1, 2019, Abhijit Chaudhuri et al.
U.S. Appl. No. 16/434,094, filed Jun. 6, 2019, Jacob Shannan Carr et al.
U.S. Appl. No. 16/434,091, filed Jun. 6, 2019, Jacob Shannan Carr et al.

RECORD-BY-RECORD LIVE MIGRATION USING A LOCK STORE

RELATED APPLICATION

This application claims benefit of priority to Indian Patent Application No. 202041019355 filed on May 6, 2020 entitled "RECORD-BY-RECORD LIVE MIGRATION USING A LOCK STORE", which is hereby incorporated by reference in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. For example, in a distributed system, a variety of storage services may be provided for storing data sets on behalf of clients. Storage services may vary in their performance, availability, storage capacity, cost, and other characteristics. In some circumstances, a client may seek to migrate a data set from one storage service to another. Prior approaches to migration often required outages during which the entire data set was inaccessible by client applications for the duration of the outage.

Figure 1:
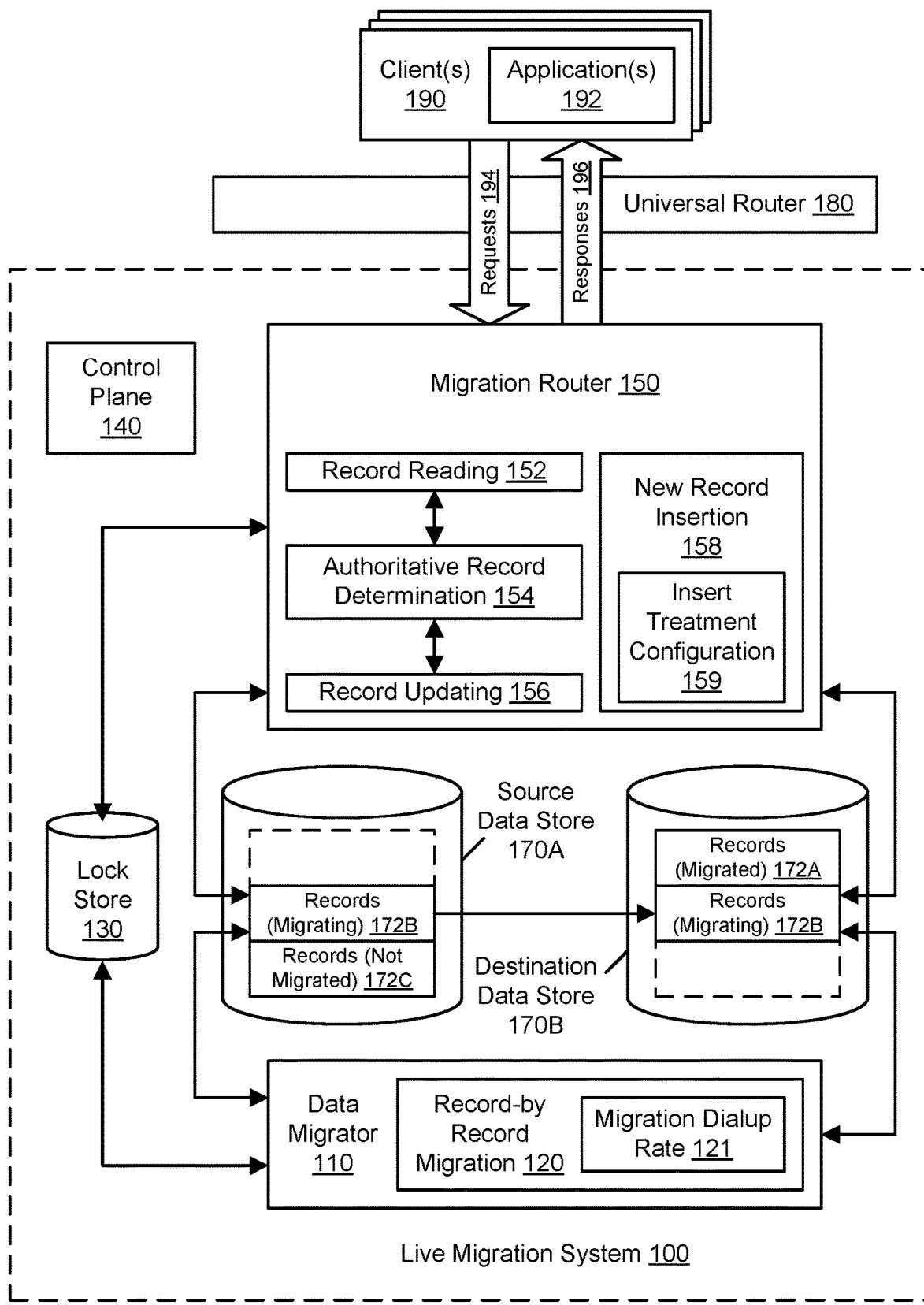
FIG. 1 illustrates an example system environment for record-by-record live migration using a lock store, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for record-by-record live migration using a lock store are described. A client of a live migration system may request migration of a data set from a source data store to a destination data store, or the live migration system itself may decide to initiate the migration in a manner transparent to the client. The source and destination data stores may vary in their performance, availability, storage capacity, location, and/or other characteristics, and the migration may seek to take advantage of such characteristics offered by the destination data store. Prior approaches to migration often required outages during which the entire data set was inaccessible by client applications for the duration of the outage. For example, an outage was often taken near the end of the migration while authority for the entire data set was flipped from the source to the destination. Using the live migration techniques described herein, a data set may be migrated between data stores record-by-record while the data set remains generally accessible to clients (e.g., for reads, writes, inserts, and deletes) and never undergoes a data-set-wide outage where clients cannot access the entire data set.

The live migration system described herein may include a lock store that may be separate from a source data store and destination data store. The lock store may issue locks on individual records having respective associated keys. The lock store may be implemented using a strongly consistent document data store which allows the live migration system to model exclusivity guarantees. For example, only a single lock of a given type may be valid for a given key at any given time. As further described below, this may prevent a migration router and a data migrator from simultaneously acquiring a lock on the same key. Also, this may prevent different migration router instances from simultaneously acquiring a lock of a given type on the same key. For example, lock acquisition at the lock store may be modeled as a conditional write, wherein an incoming attempt to acquire a lock causes a conditional write to be written in the lock store for the requested lock for a particular key, wherein the write is conditional upon there not already being another lock currently valid for the particular key. Thus, prior to acknowledging that the lock has been acquired, the lock store may verify that there are not any currently valid locks of a given type for the particular key already stored in the lock store. If there is a currently valid lock already stored in the lock store for the particular key, the conditional write may fail and the requestor of the lock may be notified that the lock request failed. Alternatively, if there are not any currently valid locks of the requested type for the particular key stored in the lock store, the conditional write may succeed in the lock store and the lock store may notify the requestor of the lock that the lock has been acquired.

Additionally, the live migration system described herein may include a data migrator, as mentioned above, that manages migration of the data set from the source to the destination on a record-by-record basis. In some embodiments, different segments of the data set may be migrated at different times to minimize the overhead of the migration. An individual record may be migrated by acquiring a migration lock on a key associated with the record in a lock store of the system, moving the record to the destination, deleting the record from the source, and deleting or releasing the migration lock for the record's key from the lock store. In some embodiments, records may be migrated according to a migration dialup rate, and the migration dialup rate may be automatically modified from time to time based on performance metrics (e.g., the success rate of per-record migration). While records are being migrated, a migration router, as mentioned above, may accept data access requests (e.g., reads, writes, inserts, and deletes) from clients.

To perform reads and updates involving existing records, the migration router may use the authoritative instance of the record in the source or destination, and the authoritative instance may be determined based on a migration direction and/or existence of a lock for the record's key. For example, if a migration direction is a forward migration from a source data store to a destination data store, and the record exists in the destination data store without a lock, the migration router may determine that the destination has the authoritative instance. If a record is in the process of being migrated (e.g., there is a migration lock for the record stored in the lock store and the record is not yet available in the destination), then a request to access that record may produce a retriable error. However, because the authority for records may be flipped from the source to the destination on a record-by-record basis, the entire data set need not be made unavailable during a data-set-wide authority flip.

To perform insertions of new records, the migration router may select either the source or destination data store according to an insert treatment configuration, also referred to herein as an insertion dialup rate. The insert treatment configuration may be automatically modified from time to time based on performance metrics (e.g., for the affected data stores) and may eventually result in all new insertions being performed in the destination. During a change in the insert treatment configuration individual instances of a distributed migration router may acquire insertion locks for a key associated with a record to be inserted while the change in the insert treatment configuration is being applied across the multiple migration router instances that implement the migration router.

For example, during a change in insert treatment configurations, some migration router instances may have switched over to apply an updated configuration before other migration router instances complete the transition to the updated insert treatment configuration. In certain circumstances two insert requests for a record with a given key may be received at the same time or nearly the same time and may be routed to different migration router instances. If one of the migration router instances has implemented the updated insert treatment configuration, but the other has not yet applied the update, there exists a possibility that a first one of the migration router instances determines a different insertion location (e.g. source data store or destination data store) that differs from an insertion location determined by the other one of the migration router instances. However, to avoid such a problem, during a transition to an updated insert treatment configuration, the migration router instances may be instructed to acquire an insert lock from the lock store for each individual record to be inserted during the transition. Thus, in the circumstance described above, the first migration router would acquire an insertion lock from the lock store indicating the record with the given key is being inserted at the source data store. In this circumstance, when the second migration router instance attempts to acquire an insert lock to insert the record with the given key at the destination data store, the second migration router instance will be denied the insert lock and instead will be informed by the lock store that there is an existing lock to insert the record with the given key at the source data store. Accordingly, the second migration router instance will insert the record with the given key at the source data store. Thus, both the first and second migration router instances cause the record with the given key to be inserted in a single location (e.g. the source data store). This ensures that only one authoritative instance of the record with the given key exists in the system, e.g. in the source or destination data store.

In some embodiments, migrations may be transparent to client applications through the use of a universal router that directs client requests to the migration router such that the applications need not be modified to perform live migrations.

Also, in order to prevent a migration router instance from writing an update to an instance of a record that is in the process of being migrated, a migration router instance may, in some circumstances as described in more detail below, acquire a lock when performing an operation that changes a state of a record. In some embodiments, a migration router may acquire an update lock if writing to a record and may acquire a delete lock if deleting a record. If another migration router instance is requested to perform an operation that changes a state of a record with the same key, the other migration router instance may decline to perform the operation for heterogeneous operations, such as a request to write a record with a delete lock, or a request to delete a record with a write lock. However, if the other migration router instance is requested to perform a homogenous operation, such as write to a record with a write lock or delete a record with a delete lock, the other migration router may move forward with carrying out the homogenous operation while the write lock or delete lock is still valid. For example, in the case of homogenous writes, the result may be that both writes are performed for the record with the given key. Alternatively, in the case of homogenous deletes, deleting the record twice may yield the same result such that the record is deleted. Also, a data migrator instance attempting to migrate a record may defer migration of the record if there is a currently valid write lock or delete lock for record. This may prevent lost writes, wherein a write is performed on an instance of the individual record in the source data store that is about to be deleted as part of the migration. This may also prevent a circumstance where an instance of the individual record is deleted from the source data store after a copy has already been migrated to the destination data store.

In some embodiments, a system that performs record-by-record live migration using a lock store, as described herein, may be implemented using a distributed system. A distributed system may involve numerous hosts, servers, compute instances, storage instances, or other components that interact via a network (or other interconnects) to perform tasks. A distributed system may undergo maintenance activities from time to time. For example, a data store may be migrated from a source to a destination. As another example, a database may be optimized to improve query performance. As yet another example, customer order histories for an online store may be subjected to analysis. To improve the performance of a distributed system during a maintenance activity, the data set on which the distributed system operates may be partitioned into a plurality of segments using a hash function or other criterion. The hash function may map a key space of the data set into a hash space, and the hash space may be divided appropriately into segments. Keys may identify various elements of data such as records in a data store, requests to services in a service-oriented architecture, customer accounts with an online store, and so on.

In some embodiments, a system includes a source data store, a destination data store, a lock store, one or more computing devices configured to implement a data migrator, and one or more computing devices configured to implement a migration router. The data migrator may be configured to initiate a migration of a data set from the source data store to the destination data store, wherein the data set comprises a plurality of individual records. Also, in some embodiments, the data migrator may be implemented in a distributed manner using a plurality of data migrator instances, wherein each data migrator instance is configured to, for an individual record, acquire, from the lock store, a lock indicating that the individual record is being migrated from the source data store to the destination data store, store, in the destination data store, an instance of the individual record, delete, in the source data store, a previously stored instance of the individual record, and delete, from the lock store, the lock indicating that the individual record is being migrated from the source data store to the destination data store.

Additionally, the migration router may be implemented in a distributed manner using a plurality of migration router instances, wherein each migration router instance is configured to, for the individual record, receive, during the migration, from a client, an update request for the individual record, attempt to acquire, from the lock store, a lock indicating that the individual record is to be updated, and receive, from the lock store, a retriable error indicating that the attempt to acquire the lock has failed due to the lock for the individual record already having been acquired by the data migrator.

Also, for an additional individual record each of the migration router instances may be configured to receive, from the client, during the migration, a request to insert the additional individual record, determine, based on an insert treatment configuration stored by the migration router, a location to insert the additional individual record, wherein the determined location is in the source data store or in the destination data store, acquire, from the lock store, a lock indicating that the additional individual record is being inserted at the determined location, and insert the additional individual record in the determined location. Also, for subsequent insert requests for the additional individual record received during the migration, the lock store may be configured to decline to issue a lock and instead provide the determined location for the additional individual record associated with the lock acquired by the migration router.

In some embodiments, a method includes receiving, at a first migration router instance, from a client during a migration, a request to insert an individual record having an associated key, wherein the migration comprises a migration of a data set by one or more computing devices configured to implement a data migrator, wherein the data set comprises a plurality of records. The method also includes determining, based on an insert treatment configuration stored by the first migration router instance, a location to insert the individual record, acquiring, from a lock store, a lock indicating that the individual record is being inserted at the determined location, and inserting the individual record in the determined location. Additionally, the method includes receiving, at a second migration router instance, from the client or another client during the migration, a request to insert another individual record with a same associated key as the key associated with the individual record inserted by the first migration router instance. The method also includes determining, based on an insert treatment configuration stored by the second migration router instance, a location to insert the other individual record, attempting to acquire, from the lock store, a lock indicating that the other individual record is being inserted at the determined location, determined by the second migration router instance, receiving, from the lock store, a notification that the attempt to acquire the lock by the second migration router instance has failed, wherein the notification indicates the determined location acquired by the first migration router instance, and inserting, by the second migration router instance, the other individual record with the same key in the determined location as indicated in the notification from the lock store.

In some embodiments, one or more non-transitory, computer-readable storage media, store program instructions that when executed on or across one or more computing devices cause the one or more computing devices to implement a data migrator. The data migrator is configured to initiate a migration of a data set from a source data store to a destination data store, wherein the data set comprises a plurality of records. Also, for an individual record, the data migrator is configured to acquire, from a lock store, a lock indicating that an individual record is being migrated from the source data store to the destination data store, store, in the destination data store, an instance of the individual record, delete, in the source data store, a previously stored instance of the individual record, and delete, from the lock store, the lock indicating that the individual record is being migrated from the source data store to the destination data store. Additionally, for another individual the data migrator is configured to attempt to acquire, from the lock store, a lock indicating that the other individual record is being migrated from the source data store to the destination data store, receive, from the lock store, an indication that the attempt to acquire the lock has failed due to another lock for the other individual record already being acquired for a modification operation, subsequent to the modification operation, acquire, from the lock store, the lock indicating that the other individual record is being migrated from the source data store to the destination data store, store, in the destination data store, an instance of the other individual record, delete, in the source data store, a previously stored instance of the other individual record, and delete, from the lock store, the lock indicating that the other individual record is being migrated from the source data store to the destination data store.

As one skilled in the art will appreciate in light of this disclosure, embodiments may be capable of achieving certain technical advantages, including some or all of the following: (1) improving the availability of a data store during migration of a data set by continuing to process requests from applications for nearly all of the data set at any given point in the migration; (2) improving the availability of a data store by eliminating the need for a data-set-wide outage associated with an authority flip of the entire data set from the source to the destination; (3) improving the consistency of data stored in the data store by implementing locks as described herein (4) improving the scalability of migration by incrementally and/or adaptively dialing up a record-by-record migration rate from the source to the destination; (5) improving the scalability of migration by incrementally and/or adaptively dialing up a new record insertion rate to the source or the destination; (6) improving availability by performing automated backoff using performance monitoring; (7) reducing the complexity and time associated with application development by not requiring changes to applications for live migration; and so on.

Record-by-Record Live Migration Using a Lock Store

FIG. 1 illustrates an example system environment for record-by-record live migration using a lock store, according to some embodiments. A live migration system 100 may enable a data set to be migrated from one data store (a source 170A) to another data store (a destination 170B) using a data migrator 110 while permitting reads, writes, inserts, and deletes from client applications 192 during the migration via a migration router 150. The data set may comprise a set of records in the source 170A, and the migration may move that data set to the destination 170B. In some embodiments, the live migration system 100 may migrate one segment or portion of the data set at a given time to reduce migration-related overhead for other segments. The live migration system 100 may minimize application 192 downtime during a migration by taking micro-outages for individual records being migrated but not an outage for the entire data set. The live migration system 100 may maintain the high availability of the source data store 170A and/or destination data store 170B during a migration by adaptively modifying the rate of record-by-record migration and/or the portion of new records inserted in the destination. In one embodiment, the live migration system 100 may prioritize correctness, then data availability, then performance.

Requests 194 from application(s) 192 operated by client (s) 190 may be directed to a universal router 180 before, during, and after a migration. Similarly, responses 196 to the requests may be routed to the application(s) 192 by the universal router 180. Before a migration is initiated, the universal router 180 may forward requests 194 to the source data store 170A. During a migration, the universal router 180 may forward requests 194 to the migration router 150 instead of directly to the source data store 170A or destination data store 170B. After the migration is complete, the universal router 180 may forward requests 194 to the destination data store 170B and no longer use the migration router 150 for the particular data set that was migrated. In one embodiment, the application(s) 192 need not be modified to perform a migration; instead the universal router 180 may be reconfigured to send requests 194 to the migration router 150 during a migration.

The live migration system 100 may be configured to work with a variety of different data stores. In one embodiment, the universal router 180 may translate, reformat, or otherwise modify requests from the application(s) as appropriate for the target data stores, e.g., via data-store-specific adapters. A plurality of data stores such as the source data store 170A and destination data store 170B may each offer storage of records, potentially using different underlying storage technologies, architectures, and/or resource types to store data. The data stores 170A-170B may be accessible via different application programming interfaces (APIs). The data stores 170A-170B may be hosted in the same or different geographical regions or network zones. In one embodiment, the data stores 170A-170B may include NoSQL data stores. In one embodiment, the data stores 170A-170B may include non-relational key-value data stores that store key-value pairs. In one embodiment, the data stores 170A-170B may include relational data stores.

The data migrator 110 may include a component for record-by-record migration 120. Using the record-by-record migration 120, the data migrator 110 may manage migration of the records from the source 170A to the destination 170B on a record-by-record basis. In some embodiments, the record-by-record migration 120 may be performed for only a portion of the data set at a given time. The table or data set to be migrated may be divided into a plurality of segments. In one embodiment, keys or other metadata for individual records may be hashed using a hash function, and the hash space may be partitioned into the various segments such that an individual record belongs to one and only one segment. As shown in the example of FIG. 1, the data set may be divided into two or more segments such as segment 172A, segment 172B, and segment 172C. At the point in time illustrated in FIG. 1, the records in segment 172A have been migrated successfully, the records in segment 172B are currently being migrated, and the records in segment 172C have not yet been migrated. By migrating segment-by-segment, the system 100 may migrate using a sliding window within the data set. In some embodiments, the segments may be determined based (at least in part) on one or more selection criteria such that a portion that meets the criteria may be migrated at a given time. In some embodiments, only records meeting the selection criteria may be migrated to the destination 170B, and other records may remain in the source 170A.

The lock store 130 may be separate from source data store 170A and destination data store 170B. The lock store 130 may issue locks on individual records 172 having respective associated keys. The lock store may be implemented using a strongly consistent document data store that performs conditional writes. For example, lock acquisition at the lock store may be modeled as a conditional write, wherein an incoming attempt to acquire a lock causes a conditional write to be written in the lock store for the requested lock for a particular key, wherein the write is conditional upon there not already being another lock currently valid for the particular key written to the lock store. Thus, prior to acknowledging that the lock has been acquired, the lock store may verify that there are not any currently valid locks of a given type for the particular key already stored in the lock store. If there is a currently valid lock already stored in the lock store for the particular key, the conditional write may fail and the requestor of the lock may be notified that the lock request failed. Alternatively, if there are not any currently valid locks of the requested type for the particular key stored in the lock store, the conditional write may succeed in the lock store and the lock store may notify the requestor of the lock that the lock has been acquired. In some embodiments, lock store 130 may store metadata along with a lock for a given key. For example, a lock store may store metadata with a lock indicating that the lock is issued to a data migrator instance performing a forward migration. As another example, a lock store may store metadata with a lock indicating the lock is issued to a data migrator instance performing a reverse migration. As another example, a lock store may store metadata with a lock indicating the lock was issued to a migration router instance to perform an insert of a record with a particular key at a particular determined location (e.g. source data store or destination data store). As another example, a lock store more store metadata with a lock indicating the lock was issued to a migration router instance to perform an update operation. Also, a lock store may store metadata indicating that a lock was issued to a data migrator instance to perform a delete operation for a particular record having a particular key. If a lock has not been issued for a particular key, the lock store may store a null state for the particular key.

An individual record may be migrated (or moved) by acquiring a forward migration lock for the record's key from the lock store 130, storing an instance of the record in the destination 170B, deleting the instance of record from the source 170A, and deleting or otherwise releasing the forward migration lock from the lock store 130. In some embodiments, records may be migrated according to a migration dialup rate 121 that affects the number of records being migrated at one time or over a particular window of time. To perform migration of different records in parallel, the data migrator 110 may use an orchestrator that supplies migration jobs (e.g., indicating keys for records to be migrated) to a plurality of data migrator instances, e.g. migration workers.

The migration dialup rate 121 may be automatically modified from time to time based (at least in part) on performance metrics. In some embodiments, the performance metrics may relate to the processor utilization, memory utilization, storage utilization, network utilization, and/or error rate of components such as data stores 170A-170B and/or a fleet of data migrator instances that implement the record-by-record migration 120 under the control of an orchestrator. For example, the migration rate 121 may be incrementally reduced (dialed down) if a sufficient number of per-record migration failures are encountered or if metrics indicate that the destination 170B is insufficiently available for migration. Reduction in the migration rate 121 may be performed as part of an automated backoff process when problems are encountered during a migration. As another example, the migration rate 121 may be incrementally increased (dialed up) if metrics indicate that the destination 170B has available capacity for additional migration while the success rate for per-record migration is sufficiently high. In one embodiment, the migration rate 121 may be determined based (at least in part) on a client-specified deadline for completing the migration, a client-specified budget for performing the migration, a predetermined schedule for rate increases, and/or other suitable criteria. By dialing up or dialing down the migration rate 121 in the manner described herein, the system 100 may adapt the record-by-record migration 120 to the characteristics of the data stores 170A-170B and/or data set.

The migration router 150 may accept data access requests 194 (e.g., reads, writes, inserts, and deletes) originating from client(s) 190 during a record-by-record migration 120. During the migration of segment 172B, requests 194 associated with records in that segment may be subject to the additional overhead of authoritative record determination 154 to determine whether the source 170A or destination 170B is authoritative for the requested record. However, at the point in time shown in FIG. 1, requests 194 for previously migrated segment 172A and not yet migrated segment 172C may not be subject to the additional overhead of authoritative record determination 154. Instead, requests associated with segment 172A may be directed to the destination data store 170B without undergoing authoritative record determination 154 or otherwise interacting with the source data store 170A, and requests associated with segment 172C may be directed to the source data store 170A without undergoing authoritative record determination 154 or otherwise interacting with the destination data store 170B.

To perform record reading 152 for a record in the segment 172B currently being migrated, the migration router 150 may use a component for authoritative record determination 154 to determine the authoritative instance of the record in the source 170A or destination 170B and return that authoritative instance to the requesting client. The authoritative instance may be determined based (at least in part) on whether an instance of the record is stored only in the source data store, only in the destination data store, or both. Also, locks and metadata associated with locks stored in the lock store 130 may be used to determine an authoritative instance of a requested record. The lock store may indicate whether there is a currently valid lock to forward migrate the record, reverse migrate the record, update the record, delete the record, etc. For example, if a forward migration lock is stored for a record in the source 170A and an instance of the record is online in the destination 170B, then the migration router 150 may determine that the destination has the authoritative instance and may provide the destination instance in the response to the request.

Similarly, to perform record updating 156 for existing records in the segment 172B currently being migrated, the migration router 150 may determine the authoritative instance of the record in the source 170A or destination 170B using locks and lock metadata stored in the lock store 130 and may then perform the requested write or delete on that authoritative instance. For example, if a forward migration lock is stored in the lock store 130 for record in the source 170A and an instance of the record is online in the destination 170B, then the migration router 150 may determine that the destination has the authoritative instance and may write to that destination instance. If a record is in the process of being migrated (e.g., there is a forward migration lock for the record stored in the lock store and the record is not yet available in the destination), then a request to access that record may produce a retriable error, such that the resulting error response may prompt the client to resend the request at a later time when the request is likely to succeed. Using the techniques described herein, an individual record may be subject to a micro-outage during migration of that record, but the remainder of the data set may remain available during that micro-outage. Because the authority for records may be flipped from the source 170A to the destination 170B on a record-by-record basis, the entire data set need not be made unavailable to application(s) 192 during a data-set-wide authority flip.

The migration router 150 may include a component for new record insertion 158 that publishes new records to the data set. As discussed above, the key for a request 194 may be hashed to determine the segment to which the request belongs. If the key belongs to the segment 172A, then the record may be published to the destination data store 170B. If the key belongs to the segment 172C, then the record may be published to the source data store 170A. If the key belongs to the segment 172B, then the record may be published to either the source destination store 170A or the destination data store 170B according to an insert treatment configuration 159. To perform insertions of new records for the segment 172B as specified in requests 194 from the client application(s) 192, the migration router 150 may select the source data store 170A or destination data store 170B on a request-by-request basis. The source 170A or destination 170B may be selected for a given insertion according to an insert treatment configuration 159. For example, if the insert treatment configuration 159 is 50%, then approximately half of all new record insertions may be performed in the source 170A while the other half may be performed in the destination 170B. As another example, if the insert treatment configuration 159 is 80%, then approximately 20% of all new record insertions may be performed in the source 170A while the remaining 80% may be performed in the destination 170B. In one embodiment, keys or other metadata associated with the insertion requests may be hashed, and the hash space may be partitioned according to the insert treatment configuration 159. For example, if the insert treatment configuration is currently 80%, then 80% of the hash space may represent keys to be published to the destination 170B, while the remaining 20% of the hash space may represent keys to be published to the source 170A.

The insert treatment configuration 159 may be automatically modified from time to time based on performance metrics (e.g., for the affected data stores). In one embodiment, the insert treatment configuration 159 for a given segment may be incrementally increased one or more times until the rate is 100%, such that all new insertions for that segment are performed in the destination 170B. In one embodiment, the record-by-record migration 120 of a segment may not be considered complete until the insert treatment configuration 159 is 100% and there are no remaining records in the segment to move from the source 170A. In some embodiments, the performance metrics associated with the insert treatment configuration 159 may relate to the processor utilization, memory utilization, storage utilization, network utilization, and/or error rate of components such as data stores 170A-170B. For example, the insert treatment configuration 159 may be incrementally reduced (dialed down) if metrics indicate that the destination 170B is insufficiently available for new insertions. As another example, the insert treatment configuration 159 may be incrementally increased (dialed up) if metrics indicate that the destination 170B has available capacity for additional insertions. In one embodiment, the insertion treatment configuration 159 may be determined based (at least in part) on a client-specified deadline for completing the migration, a predetermined schedule for rate increases, and/or other suitable criteria. By dialing up or dialing down the insert treatment configuration 159 in the manner described herein, the system 100 may adapt the record-by-record migration 120 to the characteristics of the data stores 170A-170B and/or data set.

In a distributed system that performs record-by-record live migration certain challenges may arise that must be overcome to guarantee correctness of records. For example as explained below, the use of a lock store, such as lock store 130, may be used to overcome such challenges to ensure that data remains correct during a live migration.

For example, typically migration is from an existing data store to a new cluster of computing devices implementing a destination data store. In some situations the new cluster of computing devices may not have established a predictable level of availability. For example, hardware and/or software issues may arise during the transition to the new cluster of computing devices that limit the availability of the new cluster of computing devices to service requests. To deal with this issue, a record-by-record live migration system may incrementally transition from a source data store to a destination data store. For example, in an e-commerce application, instead of changing all incoming insert requests from being routed to the source data store to being routed to the destination data store in one step, the transition may be performed incrementally via multiple steps. For example, initially a small percentage of incoming insert requests may be routed to the destination data store, while the bulk of the incoming insert requests continue to be routed to the source data store. However, as the availability of the destination data store is tested and confirmed, more and more incoming insert requests may be routed to the destination data store. For example, initially it may be that only 5% of incoming insert request are routed to the destination data store. Subsequently, this percentage may be increased in increments, such as 10%, 20%, 50%, 80%, etc.

In some embodiments, a control plane for a record-by-record live migration system, such as control plane 140, may initiate a change in the percentage of insert requests that are routed to the destination data store. For example, control plane 140 may send an insert treatment configuration update to update the insert treatment configuration 159 of new record insertion 158. In some embodiments, migration router 150 may include multiple migration router instances, each storing a current insert treatment configuration that is used by the respective migration router instance to determine where to insert records associated with incoming insert requests. In such a situation there exists a possibility that one migration router instance is applying a previous insert treatment configuration while another migration router instance has already transitioned to applying an updated insert treatment configuration. This presents a problem because under such circumstances concurrent insert requests received for a given key may be routed to different migration router instances applying different insert treatment configurations. This may result in the same record (e.g. two record having the same key) being inserted in both the source data store and the destination data store. If this were to happen, it would frustrate the principle that only a single authoritative instance of a given record exists in either the source or destination data store.

To prevent such a problem from arising while not sacrificing availability, an insert lock may be used when inserting a new record during an insert treatment configuration transition. For example, a control plane, such as control plane 140, may instruct all migration router instances of a fleet of migration router instances implementing migration router 150 to begin acquiring locks from lock store 140 prior to propagating a new insert treatment configuration to the migration router instances. Once all migration router instances have acknowledged that they are acquiring insert locks for record insertions, the control plane 140 may propagate a new insert treatment configuration to the migration router instances (e.g. to increase the percentage of insert requests that are to be routed to the destination data store). Once all migration router instances have acknowledged that the new insert treatment configuration is being applied, the control plane 140 may instruct the migration router instances that the transition to the updated insert treatment configuration has been completed and it is no longer necessary to acquire locks for insert requests (at least until another insert treatment configuration update is propagated).

During the transition in insert treatment configurations, each migration router instance may acquire an insert lock from a lock store, such as lock store 130, for a particular key of a record to be inserted prior to inserting the record. For example, a migration router instance may receive a request to insert a record with key K1. In response, the migration router instance may determine a location to insert the record with key K1 based on the current insert treatment configuration stored by the migration router instance. For example, the migration router instance may apply a hash function to key K1 and compare the result of the hash function to a current threshold associated with the current insert treatment configuration stored by the migration router instance to determine if the record is to be inserted at the source data store or the destination data store. The migration router instance may then attempt to acquire an insert lock for key K1 by writing an insert lock to the lock store 130 for key K1. The migration router instance may further write metadata associated with the lock for key K1 to the lock store 130, wherein the metadata indicates that the record with key K1 is being inserted at the determined location (determined based on the current insert treatment configuration of the migration router instance). Upon receiving confirmation from the lock store 130 that the lock for key K1 has been successfully written to the lock store 130, the migration router instance may proceed to insert the record with key K1 at the determined location (e.g. source data store 170A or destination data store 170B).

Continuing the example, another migration router instance implementing migration router 150 may receive at the same or similar time, a request to insert a record with key K1. However, during a transition in insert treatment configurations, the other migration router instance may be applying a currently stored insert treatment configuration that differs from the insert treatment configuration used by the first migration router instance to determine the insert location for the other request to insert a record with key K1. However, when attempting to acquire an insert lock from the lock store 130 for key K1, the other migration router instance may be informed that the request for an insert lock for key K1 has failed and that key K1 has been inserted at the determined location, determined by the first migration router instance. Based on receiving this indication of the determined location for key K1 from the lock store 130, the other migration router instance may proceed to insert the record with key K1 at the same determined location used by the first migration router instance instead of using the location determined based on the current insert treatment configuration of the other migration router instance. In this way, the insert lock avoids the scenario of two records with the same key being inserted in different data stores. This is because only one insert lock for a given key is allowed to be written to the lock store and subsequent insert requests for the given key are directed to the same destination as determined for the insert request for which a lock was successfully written to the lock store for the given key.

Another issue that may arise during a record-by-record live migration is a scenario in which a write request is received for an individual record that is in the process of being migrated from a source data store to a destination data store. In such a scenario, without locks, it would be possible to a write to be written to an instance of a record stored in the source data store after the record has already been copied to the destination data store but has not yet been deleted. If this were to occur, the write would be lost because it would not be applied to the instance of the individual record in the destination data store, but instead would be applied to the instance in the source data store that is about to be deleted as part of the migration. To avoid this situation, a data migrator 110 writes a forward migration lock to the lock store 130 for an individual record as part of migrating the individual record and prior to performing an update, migration router 150 attempts to acquire an update lock for the individual record by writing an update lock to lock store 130. If a migration lock is currently valid for an individual record with a given key, the lock store will not allow an update lock to be written for the given key while the migration lock remains valid. Likewise, the lock store 130 will not allow a migration lock to be written for a given key for which a currently valid update lock has been written. In some embodiments, the requestor of a lock may additionally be indicated in metadata associated with the lock. Thus if a migration router instance to which an update lock is issued becomes unresponsive, the lock for the unresponsive migration router instance may be transferred or released. Likewise if a data migrator instance becomes unresponsive a migration lock issued to the data migrator instance may be transferred or released.

In some embodiments, to enable concurrent operations to be performed on a record, multiple router instances may be allowed to a share a lock. For example, for homogenous operations, a lock may be written to lock store 130 for a first migration router instance. While the lock is still valid, a second migration router instance may receive a request to perform an operation on the same record (e.g. a record with the same key). If the two requested operations are homogenous, e.g. both write operations or both delete operations, the second migration router instance may be allowed to perform the requested operation without having to wait for the first migration router instance to release the lock. For example, if both operations are write operations, the second migration router instance may be allowed to write to the record concurrently with the first migration router instance writing to the record. Likewise, if both operations are delete operations, the second migration router instance may be allowed to delete the record and report back to the client application that the record has been deleted while the first migration router instance is also deleting the record and reporting back to a client that the record has been deleted. Because the end result is the same, e.g. the record is deleted, it is not necessary for a delete lock to prevent another migration router instance from also deleting the record. In contrast, a delete lock would prevent a data migrator instance of data migrator 110 from migrating the record being deleted. Also, an update lock would prevent a data migrator instance of data migrator 110 from migrating the record being updated.

In one embodiment, the live migration system 100 may perform a rollback that returns the complete data set to the source 170A, as if the migration 120 had not been performed. This may be referred to herein a migration in a reverse direction or a reverse migration. In one embodiment, the rollback may be performed based (at least in part) on manual intervention by a user, e.g., a user associated with the client(s) 190. For example, the user may invoke an application programming interface (API) or enter user input into a user interface in order to initiate the rollback. In one embodiment, the rollback may be performed based (at least in part) on automated intervention by the system 100 itself. For example, a component of the system 100 (such as a control plane 140) may initiate a rollback in response to observing a high error rate in the record-by-record migration 120 or determining that performance metrics for the destination 170B are sufficiently poor (e.g., with respect to a predetermined threshold). The rollback may be performed using the techniques described herein for record-by-record migration 120 by segment, but in the opposite direction, e.g. the reverse direction. Records may be copied from the destination 170B to the source 170A on a record-by-record basis as discussed for the record-by-record migration 120, e.g., with reverse migration locks being acquired from the lock store 130 when migrating an individual record. During the rollback, the migration router 150 may continue to perform authoritative record determination 154 for reads 152 and updates 158. During the rollback, the migration router 150 may reduce the insertion dialup rate 159 to 0%, either incrementally or all at once, such that new insertions are performed in the source 170A and not the destination 170B.

In some embodiments, the data stores 170A-170B may use persistent storage resources such as hard disk drives, solid-state drives, and so on. The data stores 170A-170B may offer storage in a manner independent of each other. The data stores 170A-170B may use different underlying storage technologies, architectures, and/or resource types to store data. The data stores 170A-170B may be accessible via different application programming interfaces (APIs). For example, data objects may be added to data store 170A via a first set of one or more APIs, and data objects may be added to data store 170B via a second set of one or more APIs that differ in some way from the first set. The data stores 170A-170B may be hosted in the same or different geographical regions. In some embodiments, the data stores 170A-170B may be maintained by different business entities or service providers. In some embodiments, the data stores 170A-170B may be maintained by different divisions within a single business entity or enterprise.

In one embodiment, one or more of the data stores 170A-170B may represent a distributed hash table (DHT). In one embodiment, the data stores 170A-170B may include non-relational key-value data stores (e.g., NoSQL stores) that store key-value pairs. In one embodiment, the data stores 170A-170B may include relational data stores. In order to be usable with the system 100, the data stores 170A-170B may satisfy a minimal set of requirements, such as offering APIs for getting a value by key, putting a value by key, conditionally putting a value by key, and deleting a key-value pair. The data stores 170A-170B may differ in their performance characteristics. For example, one data store may represent a hot storage tier with lower latency, while another data store may represent a cold storage tier with higher latency but lower cost and a longer storage window. In one embodiment, one or more of the data stores 170A-170B may represent a hosted data storage solution offering security, speed, availability, reliability, and scalability. In one embodiment, one or more of the data stores 170A-170B may be offered as a storage service available to many clients (internal to an enterprise and/or external to the enterprise). The data stores 170A-170B may scale to handle a very large amount of data, and a fleet of hosts that implement the live migration system 100 may also scale to handle such data.

The live migration system 100 may be implemented using one or more services. Each of the services may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. This modularity may enable services to be reused in order to build various applications through a process referred to as orchestration. A service may include one or more components that may also participate in the distributed system, e.g., by passing messages to other services or to other components within the same service. A service may offer one or more application programming interfaces (APIs) or other programmatic interfaces through which another service may request the functionality of the service. Components of the live migration system 100, such as the data migrator 110 and/or migration router 150, may be configured to process requests from various internal or external systems, such as client computer systems 190 or computer systems consuming networked-based services (e.g., web services). For instance, an application 192 on a client computer system 190 may submit a request to read a record from the data set being migrated, and that request may be directed to the migration router 150 via the universal router 180. Services may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP).

Figure 15:
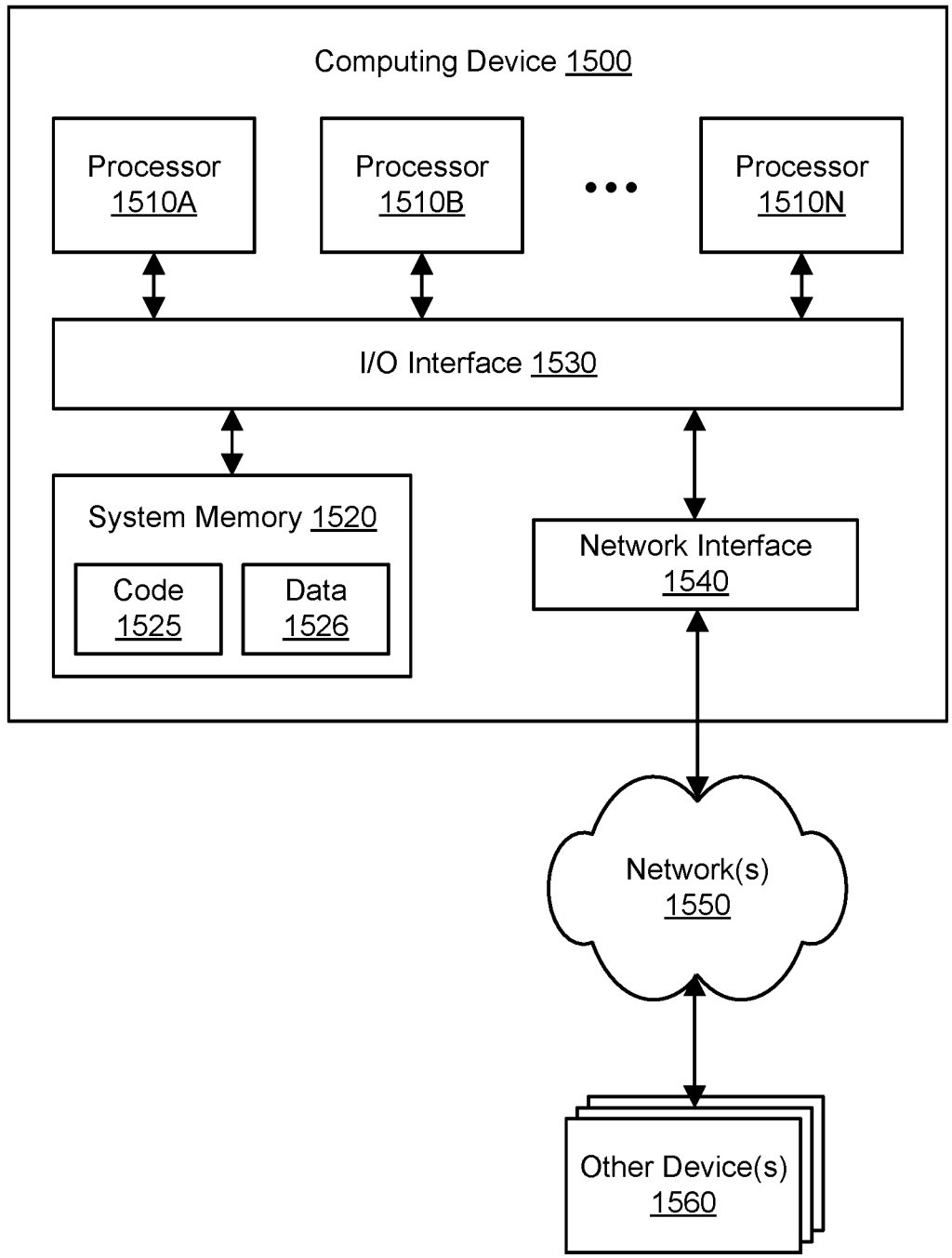
FIG. 15 illustrates an example computing device that may be used in some embodiments.

The live migration system 100 may include one or more computing devices, any of which may be implemented by the example computing device 1500 illustrated in FIG. 15. For example, the data migrator 110 may be implemented using one or more computing devices, and that number of devices may scale up or down according to the needs of a particular migration (e.g., the size of the segment 172B and/or migration dialup rate 121). In various embodiments, the functionality of the different services, components, and/or modules of the live migration system 100 may be provided by the same computing device or by different computing devices. If any of the various components are implemented using different computing devices, then the respective computing devices may be communicatively coupled, e.g., via a network. Each of the components of the live migration system 100 may represent any combination of software and hardware usable to perform their respective functions, as discussed as follows. Functions implemented by the live migration system 100 may be performed automatically, e.g., without a need for user initiation or user intervention after an initial configuration stage, and programmatically, e.g., by execution of program instructions on at least one computing device. In one embodiment, aspects of the live migration system 100 may be performed repeatedly over time. The live migration system 100 may include additional components not shown, fewer components than shown, or different combinations, configurations, or quantities of the components shown.

The migration router 150 may be implemented using a plurality of different instances that are distributed throughout one or more networks, and each instance may offer access to the functionality of a live request router to various clients 190 (via the universal router 180). An individual instance of the router 150 may be implemented using one host or a plurality of hosts, any of which may be implemented by the example computing device 1500 illustrated in FIG. 15. The number of hosts may scale up or down according to the needs of a particular migration (e.g., the size of the segment 172B and/or volume of requests 194). Similarly, any of the data stores 170A-170B may represent one or more service instances and may be implemented using one host or a plurality of hosts, any of which may be implemented by the example computing device 1500 illustrated in FIG. 15. The hosts may be located in any suitable number of data centers or geographical locations. In one embodiment, multiple services and/or instances of the same service may be implemented using the same host.

It is contemplated that any suitable number and configuration of clients 190 may interact with the services of the live migration system 100. Components shown in FIG. 1 may convey network-based service requests to one another via one or more networks. In various embodiments, the network(s) may encompass any suitable combination of networking hardware and protocols necessary to establish network-based communications between two services. For example, the network(s) may generally encompass the various telecommunications networks and service providers that collectively implement the Internet. The network(s) may also include private networks such as local area networks (LANs) or wide area networks (WANs) as well as public or private wireless networks. The network(s) may include the hardware (e.g., modems, routers, switches, load balancers, proxy servers, etc.) and software (e.g., protocol stacks, accounting software, firewall/security software, etc.) necessary to establish a networking link between a first component and the Internet as well as between the Internet and a second component. In some embodiments, components may communicate with one another using a private network rather than the public Internet.

In one embodiment, aspects of the live migration system 100 may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 2:
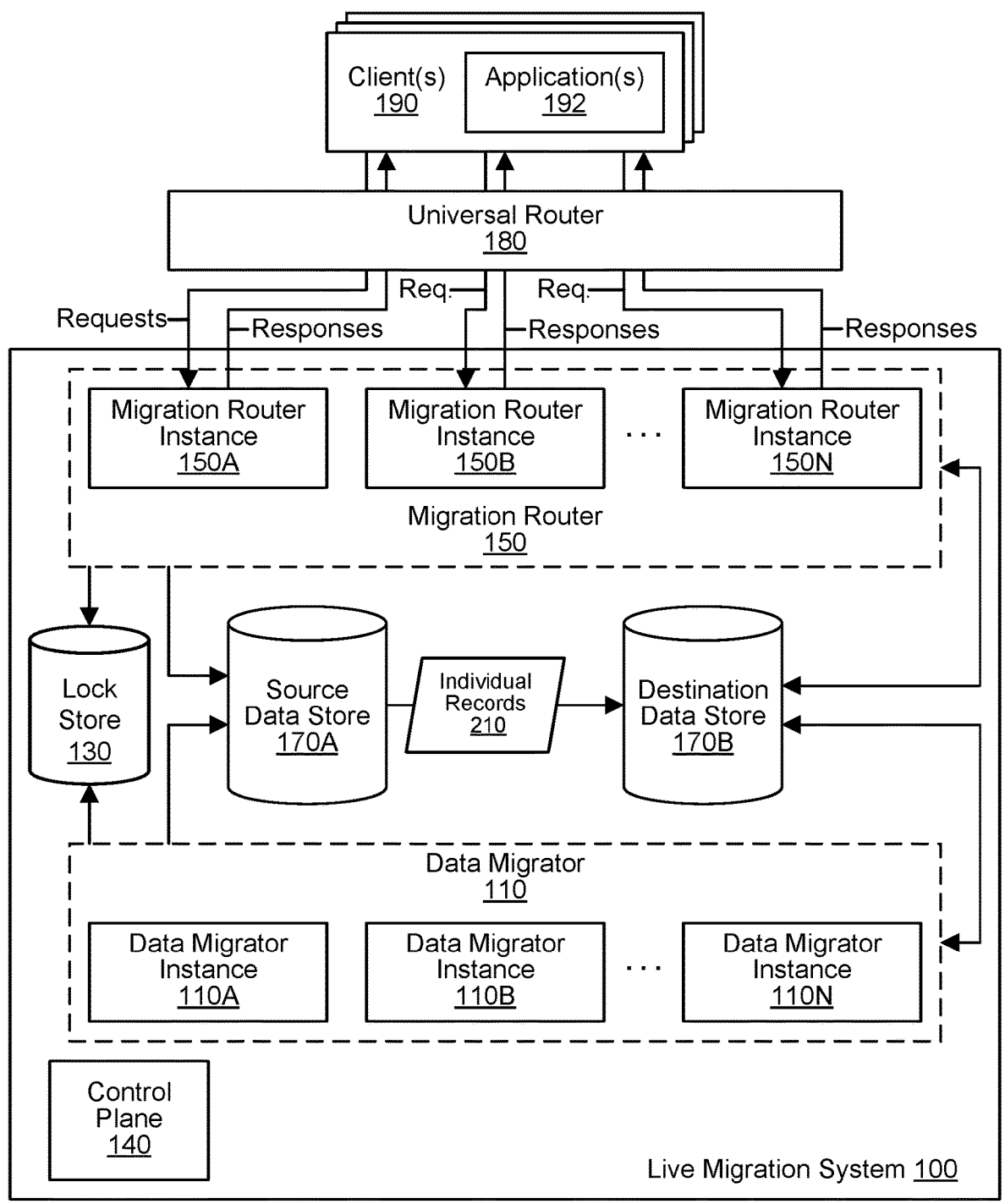
FIG. 2 illustrates further aspects of the example system environment for record-by-record live migration using a lock store, including distributed migration router instances that implement the migration router and distributed data migrator instances that implement the data migrator, according to some embodiments.

FIG. 2 illustrates further aspects of the example system environment for record-by-record live migration using a lock store, including distributed migration router instances that implement the migration router and distributed data migrator instances that implement the data migrator, according to some embodiments.

As discussed above, in some embodiments, a migration router 150 may be implemented via multiple migration router instances. For example FIG. 2 illustrates migration router instances 150A and 150B through 150N that implement migration router 150. Note that "N" denotes that any number of migration router instances may be used to implement migration router 150. In some embodiments, each migration router instance 150A, 150B, 150N, etc. may function as a migration router worker that carries out a particular thread assigned to the worker. For example a record update thread, a record insert thread, a record delete thread, etc. may be assigned to a given migration router instance 150A, 150B, 150N, etc. In some embodiments, each of migration router instances 150A, 150B, 150N, etc. may include a new record insertion module 158. Also each migration router instance may locally store an insert treatment configuration 159. In some embodiments, each migration router instance 150A, 150B, 150N, etc. may also include a record reading module 152, an authoritative record determination module 154, and a record updating module 156. In some embodiments, control plane 140 may assign threads to migration router instances 150A, 150B, 150N, etc. Also, in some embodiments, migration router 150 may include an orchestration module (not shown) that assigns threads to migration router instances 150A, 150B, 150N, etc.

Also, in some embodiments, data migrator 110 may be implemented via multiple data migrator instances 110A and 110B through 110N, where "N" denotes any number of data migrator instances may be used to implement data migrator 110. In some embodiments, each data migrator instance 110A, 110B, 110N, etc. may include a record-by-record migration module 120 that carries out the migration of individual records 210. In some embodiments, control plane 140 may coordinate record migration amongst the data migrator instances 110A, 110B, 110N, etc., or in some embodiments data migrator 110 may include an orchestration module (not shown) that coordinates record migration amongst the data migrator instances 110A, 110B, 110N, etc.

In some embodiments, control plane 140 may instruct data migrator instances 110A, 110B, 110N, etc., to change a migration direction. For example each data migrator instance 110A, 110B, 110N, etc., may be configured to receive an instruction from the control plane to change a direction of migration from a forward migration to a reverse migration, and vice versa. In response to receiving such an instruction, the respective data migrator instances 110A, 110B, 110N, etc. may complete any outstanding migration operations for individual records that were initiated before receiving the instruction to change the direction of the migration. The respective data migrator instances 110A, 110B, 110N, etc. may subsequently acknowledge that the instruction to change the migration direction has been applied.

In some embodiments, instead of instructing the individual data migrator instances to change a migration direction and waiting for confirmation to be received from the data migrator instances, the control plane may simply temporarily stop the migration in the original direction by terminating data migrator instances configured to perform the migration in the original direction. The control plane may then commission a new fleet of data migrator instances that are configured to perform a migration in a reverse direction. In some embodiments, momentary pauses in migration may be acceptable in comparison to overhead costs required to coordinate with each data migrator instance to verify that the data migrator instance has reversed direction. Also, in some embodiments, stopping the forward migration across all data migrator instances at the same time may speed up the migration in the reverse direction. This is because all forward migration may be stopped up front, instead of being phased in as individual data migrator instances are re-configured.

In some embodiments, the control plane 140 may further indicate to the migration router instances 150A and 150B through 150N that the migration direction has been reversed. In response, the authoritative record determination modules 154 of the migration router instances 150A and 150B through 150N may take into account the reversed direction of the migration when determining an authoritative instance of a record. For example, the presence of the record in the original destination data store may no longer necessarily mean that the record is authoritative as the record may have been migrated back to the source data store. Therefore, during a change in migration direction, a migration router instance may additionally acquire update or delete locks on records that are only located in the original destination data store in addition to records that are only located in the original source data store, whereas it may not have been necessary to acquire locks on records in the destination data store during a forward migration.

In some embodiments, a migration router may acquire locks for all updates or deletes while a migration direction change is being propagated. In some embodiments, once all data migrator instances have confirmed to the control plane that the migration direction has been reversed, the control plane may indicate to the migration router instances that the migration direction change has been implemented. In response to this indication, the migration router instances may not be required to acquire a write lock or a delete lock when updating a record in the original source data store, as it will not be migrated out of the source data store in a reverse direction migration.

Figure 3:
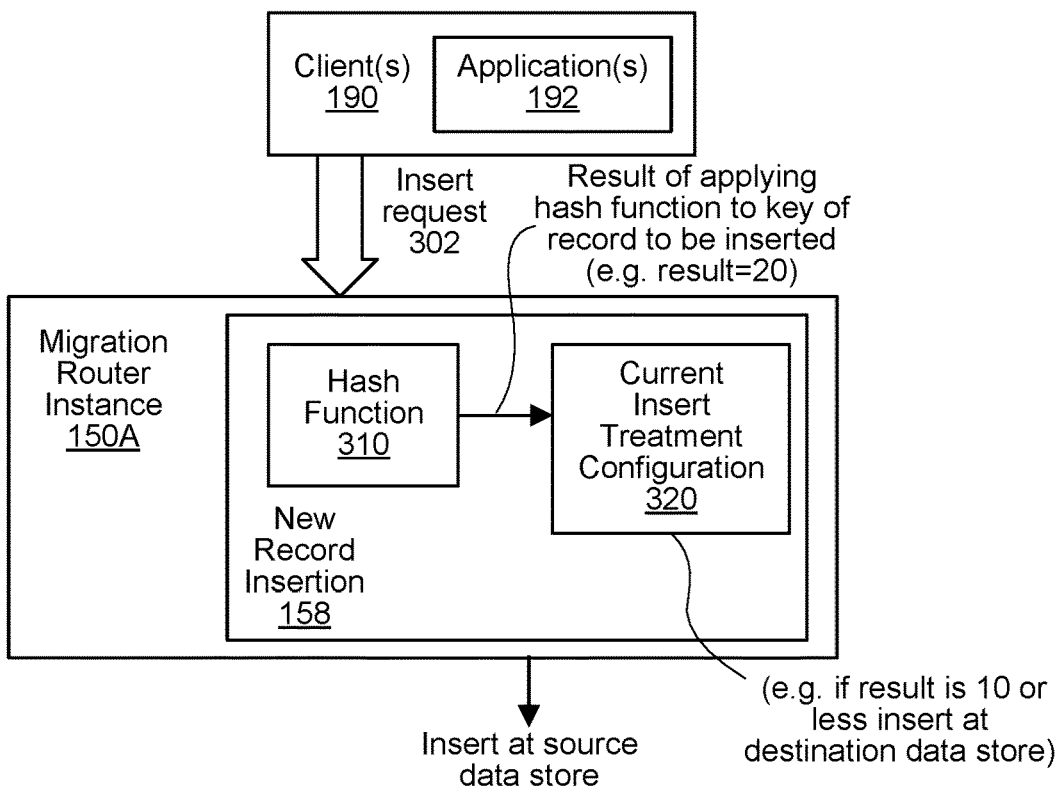
FIG. 3 illustrates migration router instances that apply a current and updated insert treatment configuration to determine a location to insert a record, according to some embodiments.
Figure 4:
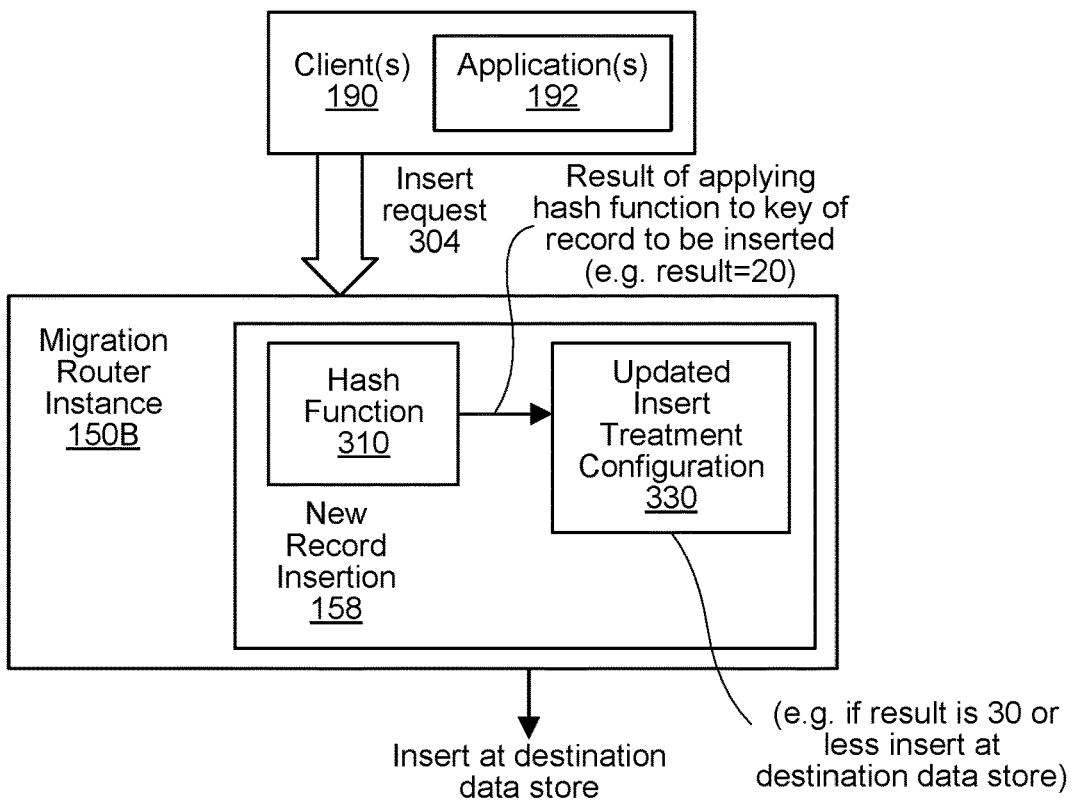
FIG. 4 illustrates migration router instances that apply a current and updated insert treatment configuration to determine a location to insert a record, according to some embodiments.

FIGS. 3 and 4 illustrate migration router instances that apply a current and updated insert treatment configuration to determine a location to insert a record, according to some embodiments.

As explained above, in some embodiments, each migration router instance may store an insert treatment configuration to use to determine whether a record that is requested to be inserted should be inserted in the source data store or the destination data store. For example, migration router instance 150A stores a current insert treatment configuration 320 and migration router instance 150B stores an updated insert treatment configuration 330, which may be an update compared to the current insert treatment configuration 320. During a transition in insert treatment configurations, for a limited amount of time during the transition, some migration router instances may have transitioned to an updated insert treatment configuration, while other migration router instances still have not transitioned to the updated insert treatment configuration. Thus for some period of time during the transition, migration router instance 150A may still be applying insert treatment configuration 320 while migration router instance 330 has already transitioned to insert treatment configuration 330.

In some embodiments, a new record insertion module 158 of a migration router instance, such as of migration router instance 150A or 150B, may include a hash function 310. In some embodiments, the hash function 310 may be used to calculate a hash value based on the key of the record to be inserted. For example, the new record insertion module 158 may extract the key of the record to be inserted and apply hash function 310 to calculate a floating point value between 0 and 1. The hash function 310 and/or the new record insertion module 158 may map the floating point value onto a number between 0 and 100, inclusive of both 0 and 100. The new record insertion module may then compare the mapped number to the insert treatment configuration, wherein if the number is less than the insert treatment configuration the record to be inserted is inserted at first location and if the number is greater than or equal to the insert treatment configuration the record to be inserted is inserted at the other location.

For example, FIGS. 3A and 3B illustrate an example where the number resulting from the hash function applied to the key of the record to be inserted is "20." Also the current treatment configuration 320 is that if the result of the hash function 310 is 10 or less than the record to be inserted is inserted at the destination data store. Because 20 is greater than 10, the record to be inserted by migration router instance 150A is inserted at the source data store. Thus, migration router instance 150A attempts to acquire an insert lock from lock store 130 indicating that the record to be inserted is to be inserted at the source data store. Because no insert lock is currently stored for a record with the key of the record to be inserted, migration router instance 150A is successful at acquiring the insert lock.

However, migration router instance 150B has already transitioned to insert treatment configuration 330, which states that if the result of the hash function 310 is 30 or less, the record to be inserted is to be inserted at the destination data store. Because 20 is less than 30, migration router instance 150B determines that the record is to be inserted at the destination data store—not the source data store as determined by migration router instance 150A. When migration router instance 150B attempts to acquire an insert lock on the key of the record to be inserted, the lock store declines to write the insert lock because an insert lock has already been issued to migration router instance 150A for the same key. Accordingly, migration router instance 150B receives an indication that there is an existing insert lock for the given key indicating a determined insert location being the source data store. In response, migration router instance 150B inserts the record at the source data store—not the destination data store as was determined based on the updated insert treatment configuration 330 stored by migration router instance 150B. As explained above, such a use of insert locks prevents two copies of a record with the same key from being inserted in both the source and destination data stores.

FIGS. 5A-5I illustrate a migration router instance responding to a request to modify a record currently being migrated and the migration router instance responding to multiple insert requests that are received while a treatment configuration update is in the process of being implemented on distributed migration router instances, according to some embodiments.

Figure 5A:
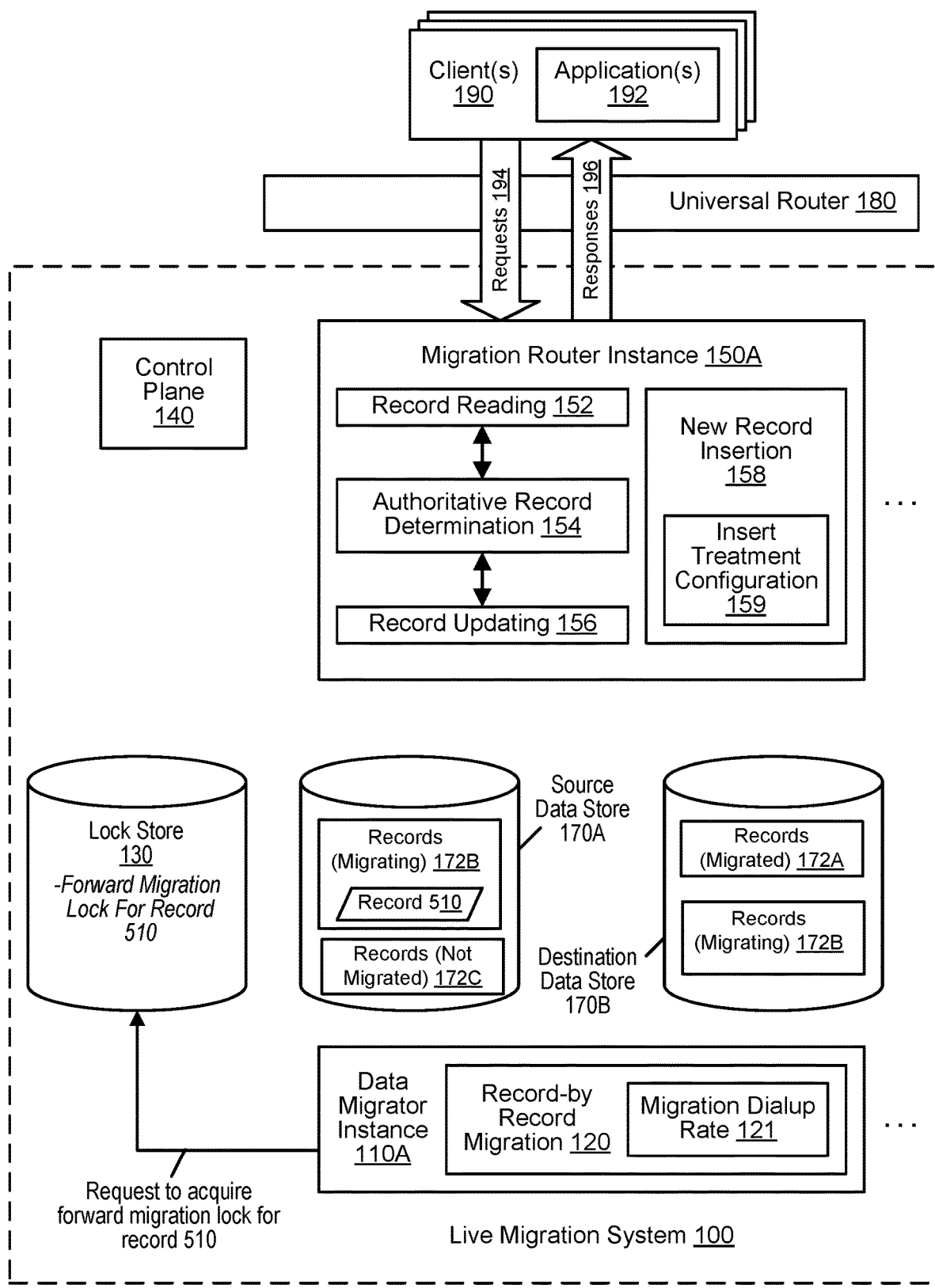
FIGS. 5A-5I illustrate a migration router instance responding to a request to modify a record that is currently being migrated and the migration router instance responding to multiple insert requests received while a treatment configuration update is in the process of being implemented on distributed migration router instances, according to some embodiments.

In FIG. 5A, data migrator instance 110A acquires a forward migration lock for record 510 stored in source data store 170A. Because there are no current update or delete locks for record 510 currently stored in lock store 130, the lock store 130 writes the forward migration lock for record 510 and acknowledges to data migrator instance 110A that a forward migration lock has been acquired for record 510. Note in some embodiments, record 510 may be identified by an associated key, and the forward migration lock may be written to the lock store 130 for the key associated with record 510.

Figure 5B:
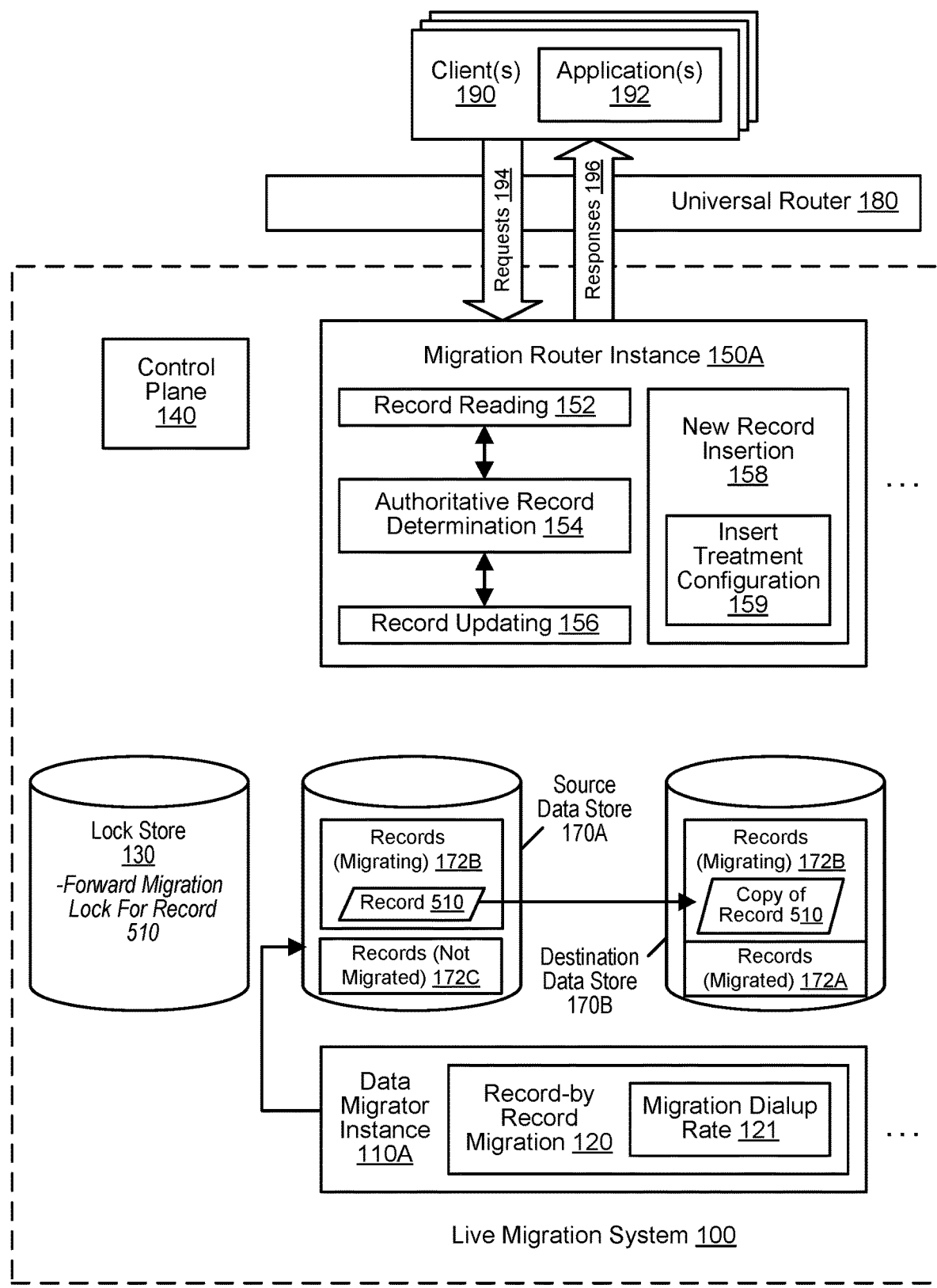

In FIG. 5B, data migrator instance 110A, after having acquired the forward migration lock for record 510, writes an instance of record 510 (e.g. a copy of record 510) to the destination data store 170B.

Figure 5C:
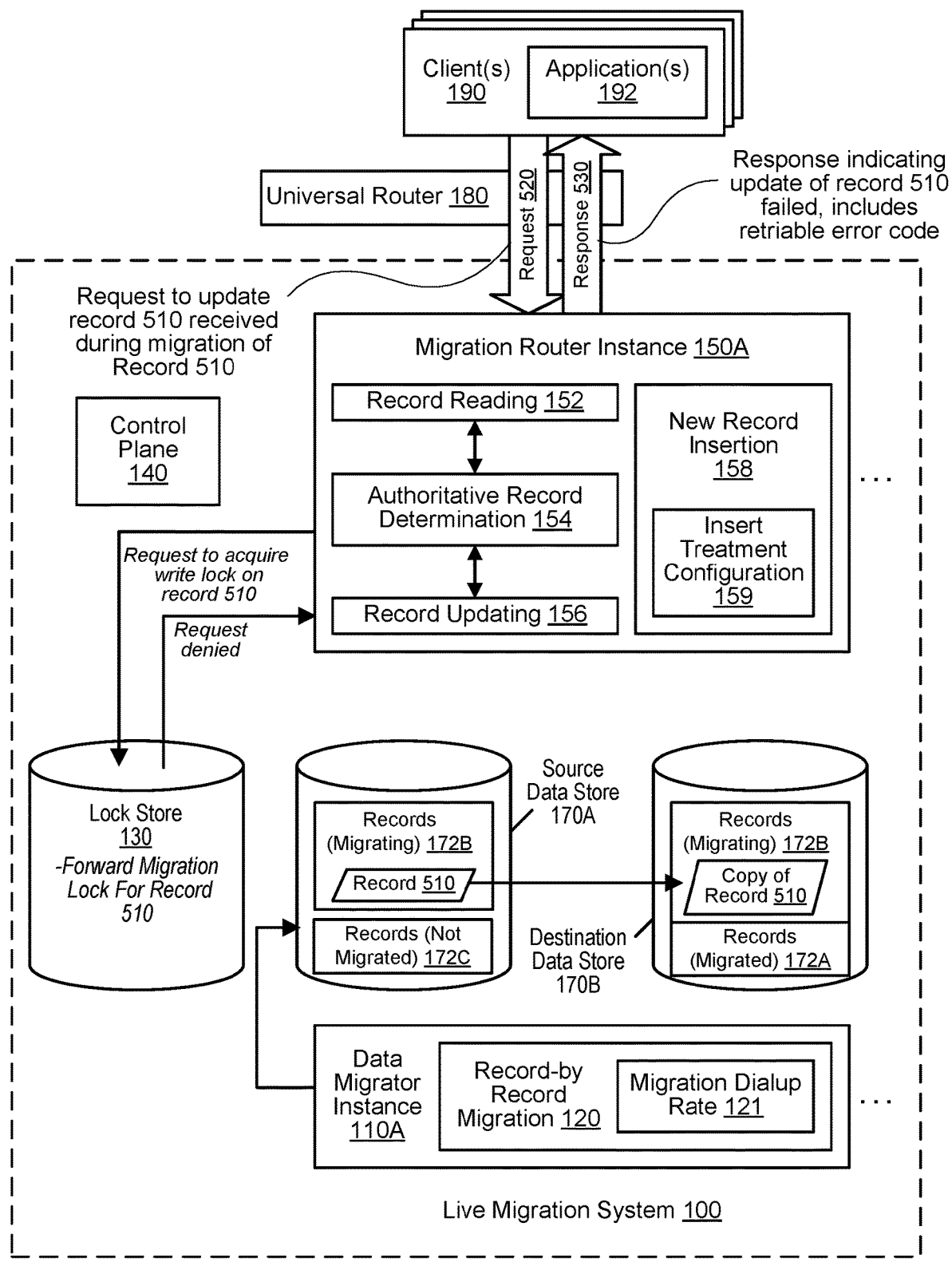

In FIG. 5C, migration router instance 150A receives a specific request 520 to update record 510, wherein the request is received while data migrator instance 110A is in the process of migrating record 510 from source data store 170A to destination data store 170B. In response to receiving the request 520, migration router instance 150A attempts to acquire an update lock from lock store 130 for record 510. However, because there is a currently valid forward migration lock stored for record 510 (issued to data migrator instance 110A), the attempt to acquire the update lock for record 510 fails. Accordingly, migration router instance 150A provides response 530 to clients 190/applications 192 indicating that the request to update record 510 has failed. In some embodiments, response 530 may include a retriable error code, indicating that the update failed but may be re-tried and is likely to succeed once the migration of record 510 is completed.

Figure 5D:
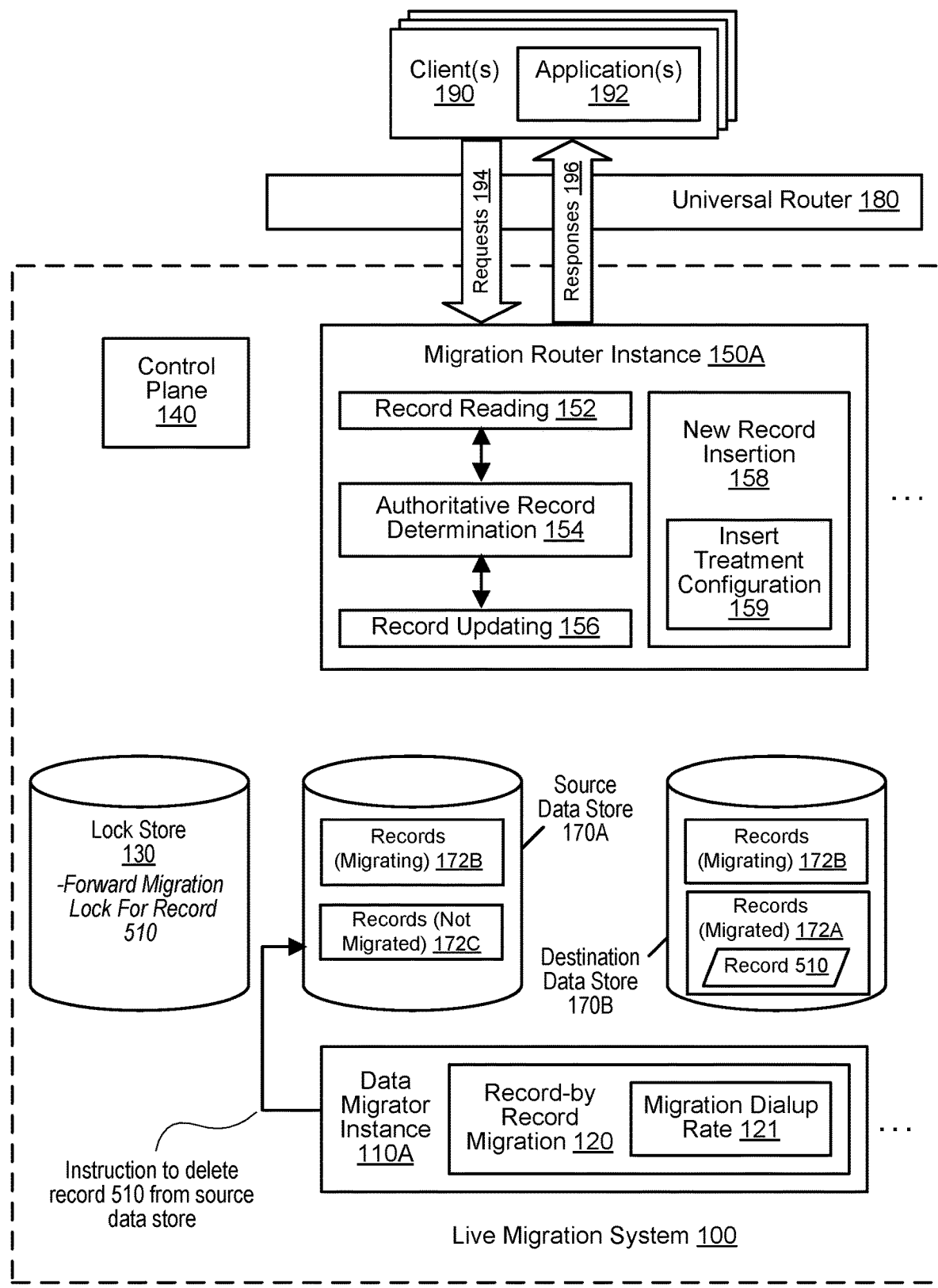

In FIG. 5D, subsequent to writing an instance of record 510 to the destination data store 170B, data migrator instance 110A issues an instruction to delete record 510 from the source data store 170A.

Figure 5E:
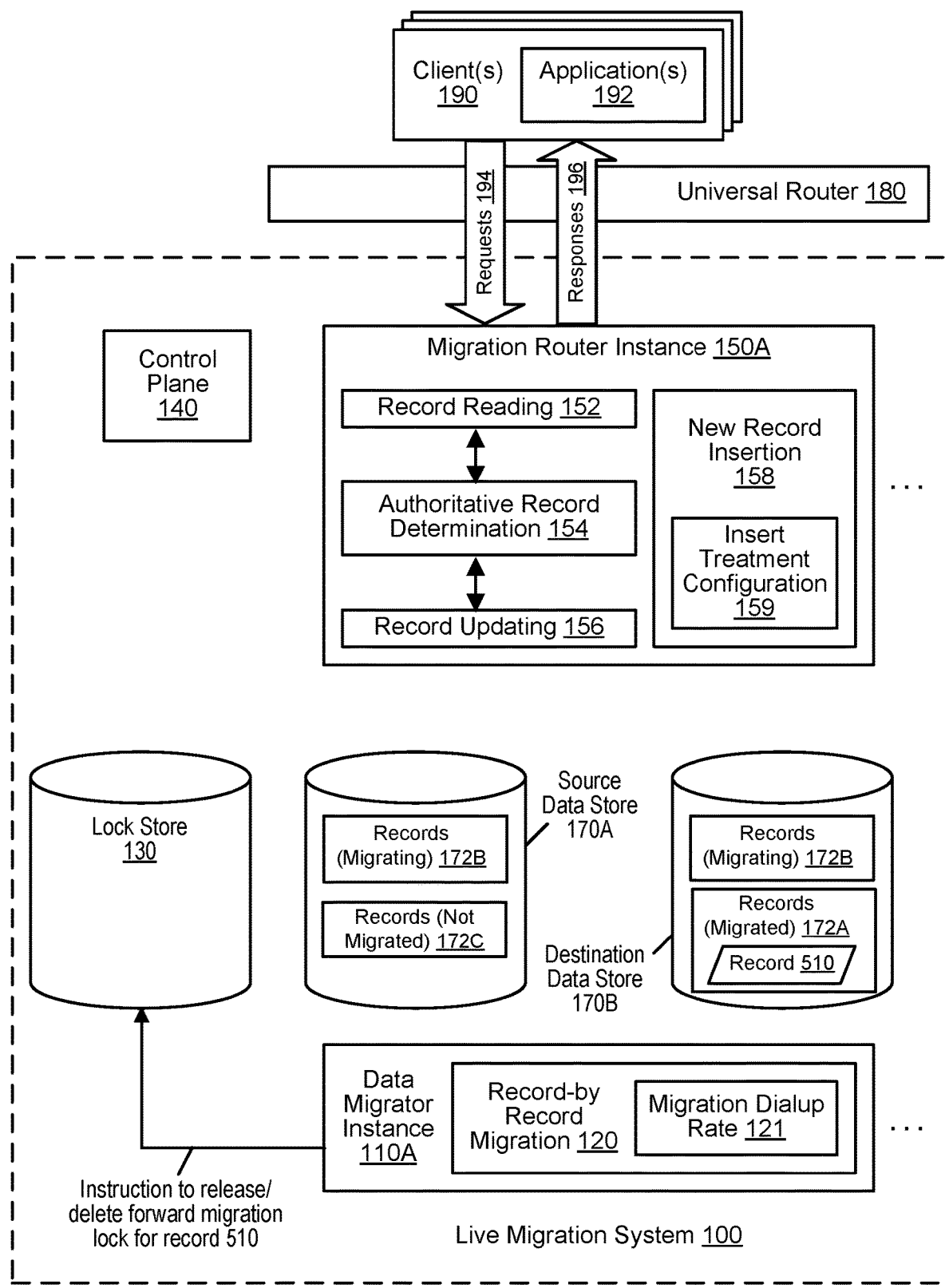

In FIG. 5E, subsequent to deleting the instance of record 510 from source data store 170A, data migrator instance 110A deletes the forward migration lock for record 510 from lock store 130. In response, lock store 130 deletes/releases the forward migration lock on record 510. At this point the migration of record 510 is complete. The data migrator instance 110A may then repeat a similar process for another record that is to be migrated from source data store 170A to destination data store 170B. Additionally, other ones of data migrator instances 110B through 110N may follow a similar process to migrate other records, one-by-one, from source data store 170A to destination data store 170B. Once the migration of record 510 is complete, the clients 190/applications 192 may retry the update of record 510.

Figure 5F:
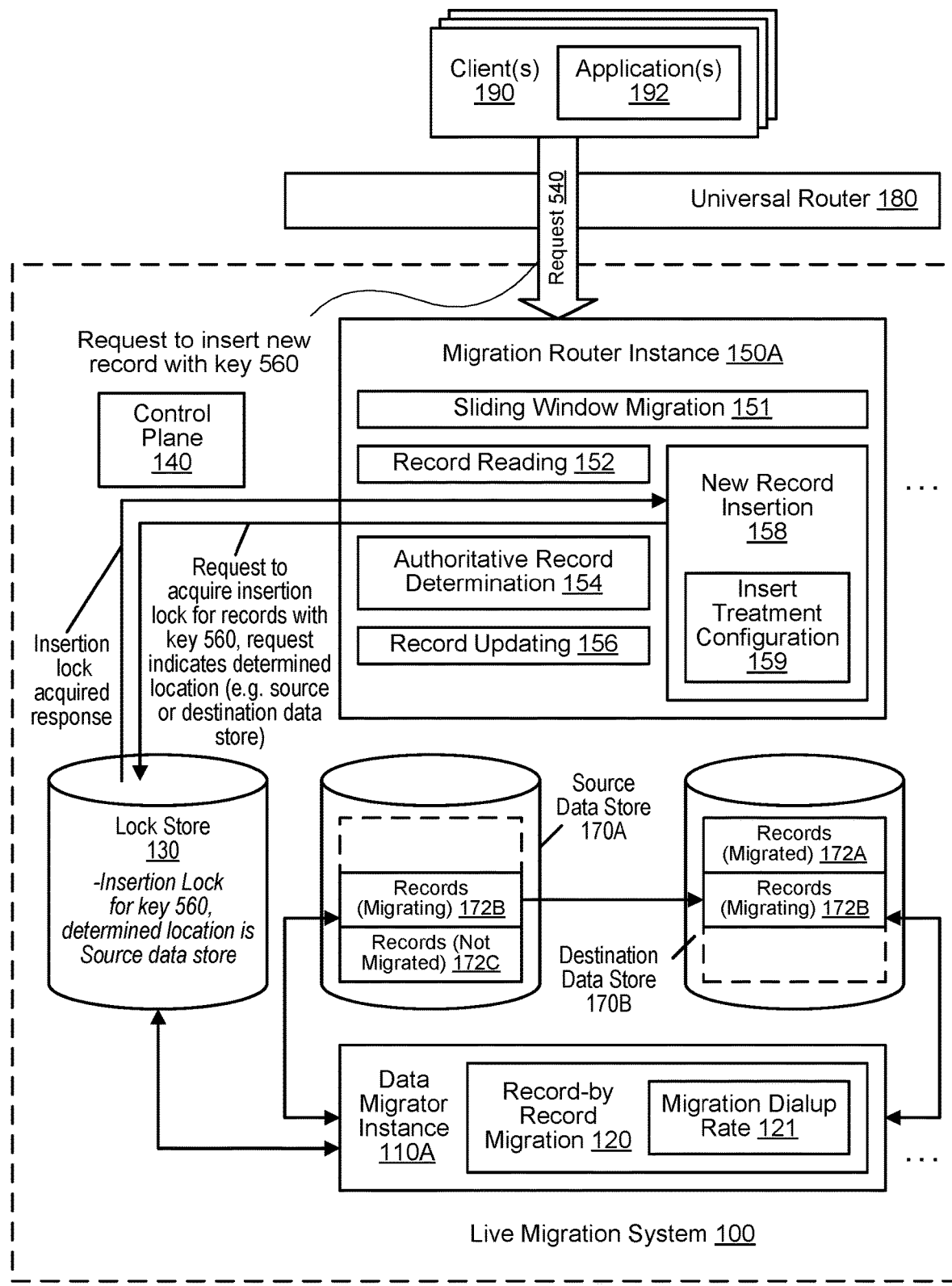

In FIG. 5F during the migration of records from source data store 170A to destination data store 170B, and while an updated insert treatment configuration is being propagated to migration router instances 150A through 150N, migration router instance 150A receives request 540 to insert a new record with key 560. In response, new record insertion module 158 determines a location to insert the record with key 560 based on a hash of the key 560 and the currently stored insert treatment configuration 159 for migration router instance 150A, for example as described in regard to FIGS. 3A and 3B. Migration router instance 150A then attempts to acquire an insert lock from lock store 130 for a record with key 560. The request for the insert lock also includes the determined location for the record to be inserted as determined based on the insert treatment configuration 159 of migration router instance 150A. Because there is not an insert lock currently stored for key 560 in lock store 130, the insert lock for key 560 is written to lock store 130 along with metadata indicating that the record with key 560 is being inserted at the determined location. For example, FIG. 5F shows that lock store 130 has written an insertion lock for key 560 indicating that the determined insertion location for key 560 is the source data store 170A.

Figure 5G:
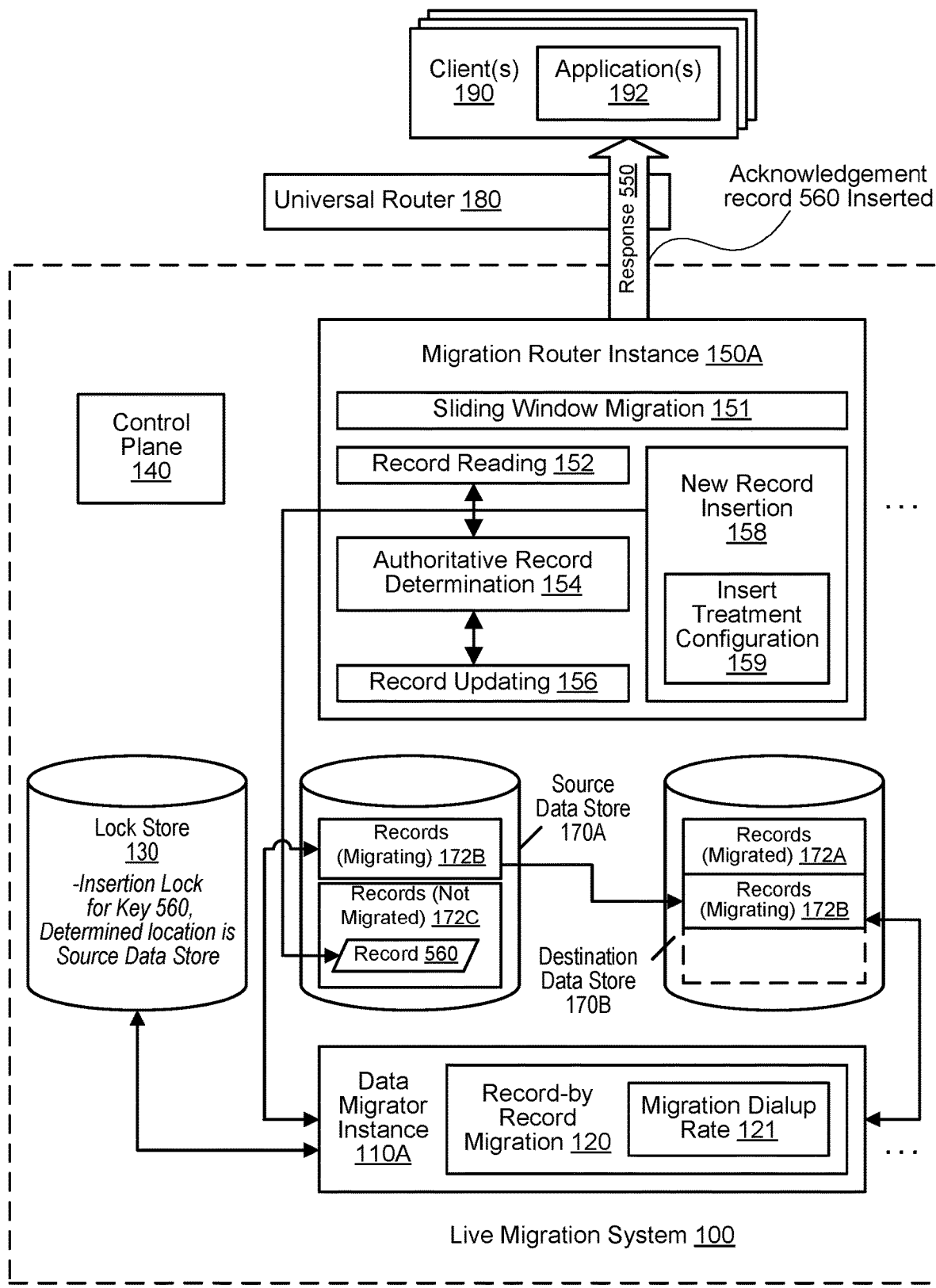

In FIG. 5G, migration router instance 150A then inserts a record with key 560 in source data store 170A and provides clients 190/applications 192 with response 550 acknowledging that the record with key 560 has been inserted.

Figure 5H:
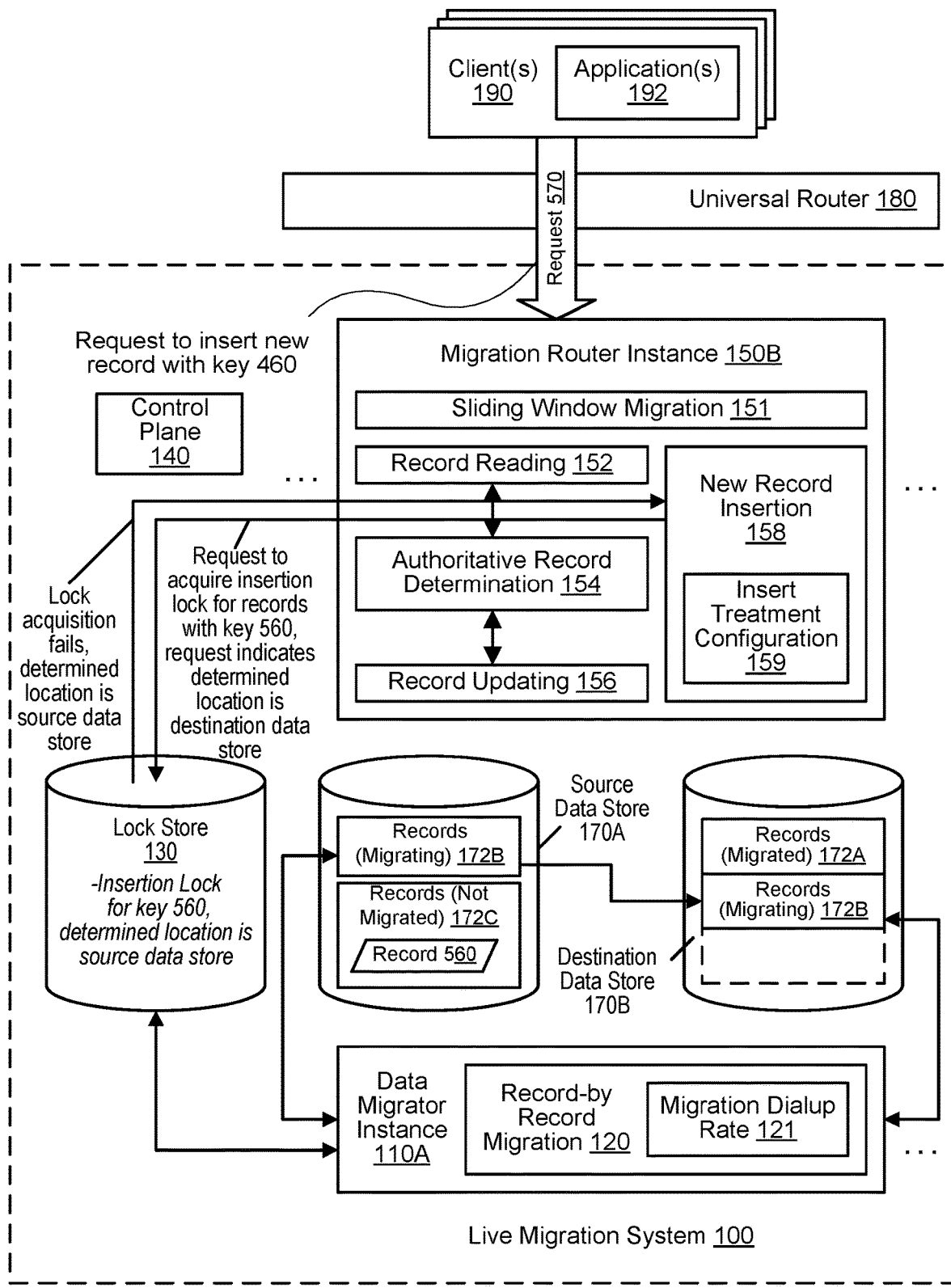

In FIG. 5H during the migration of records from source data store 170A to destination data store 170B, and while an updated insert treatment configuration is being propagated to migration router instances 150A through 150N, migration router instance 150B receives request 570 to insert a new record with key 560. In response, new record insertion module 158 of migration router instance 150B determines a location to insert the record with key 560 based on a hash of the key 560 and the currently stored insert treatment configuration 159 stored by migration router instance 150B. Migration router instance 150B then attempts to acquire an insert lock from lock store 130 for a record with key 560. The request also includes the determined location for the record to be inserted as determined based on the insert treatment configuration 159 of migration router instance 150B. Because there is already an insert lock currently stored for key 560 in lock store 130, the request to write an insert lock for key 560 fails. However, migration router instance 150B is provided access to the metadata stored with the insert lock for key 560 indicating that records with key 560 are to be inserted at the source data store.

Figure 5I:
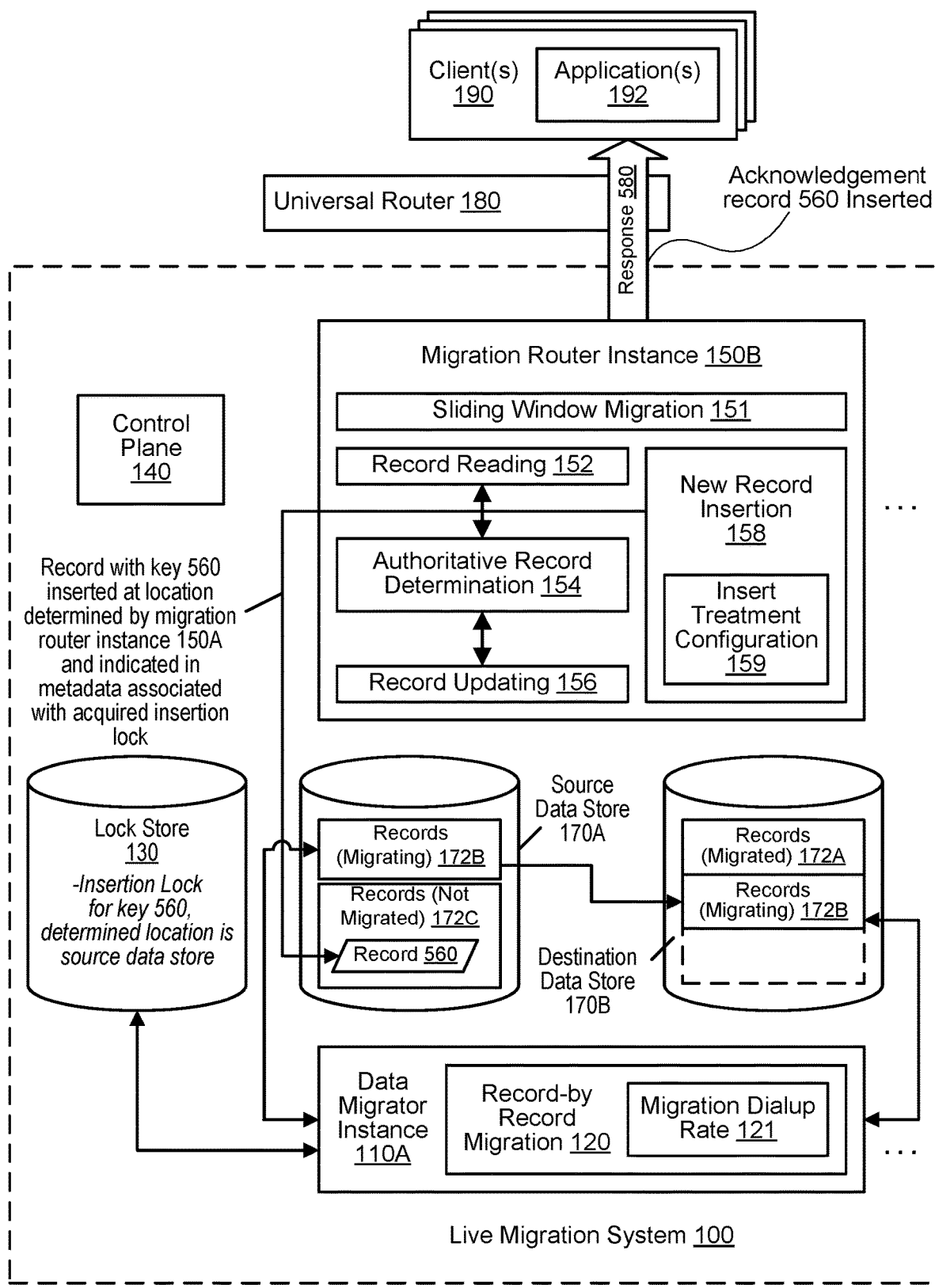

In FIG. 5I, the migration router instance 150B then inserts the record with key 560 at source data store 170A. If the version of record 560 inserted by migration router instance 150A and the version of record 560 inserted by migration router instance 150B differ, migration router instance 150B may simply write the difference to the existing version of record 560 already inserted by migration router instance 150A. Also, migration router instance 150B, may then provide response 580 to clients 190/applications 192 indicating that record 560 has been inserted.

FIGS. 6A-6E illustrate propagation of a treatment configuration update to migration router instances, according to some embodiments.

Figure 6A:
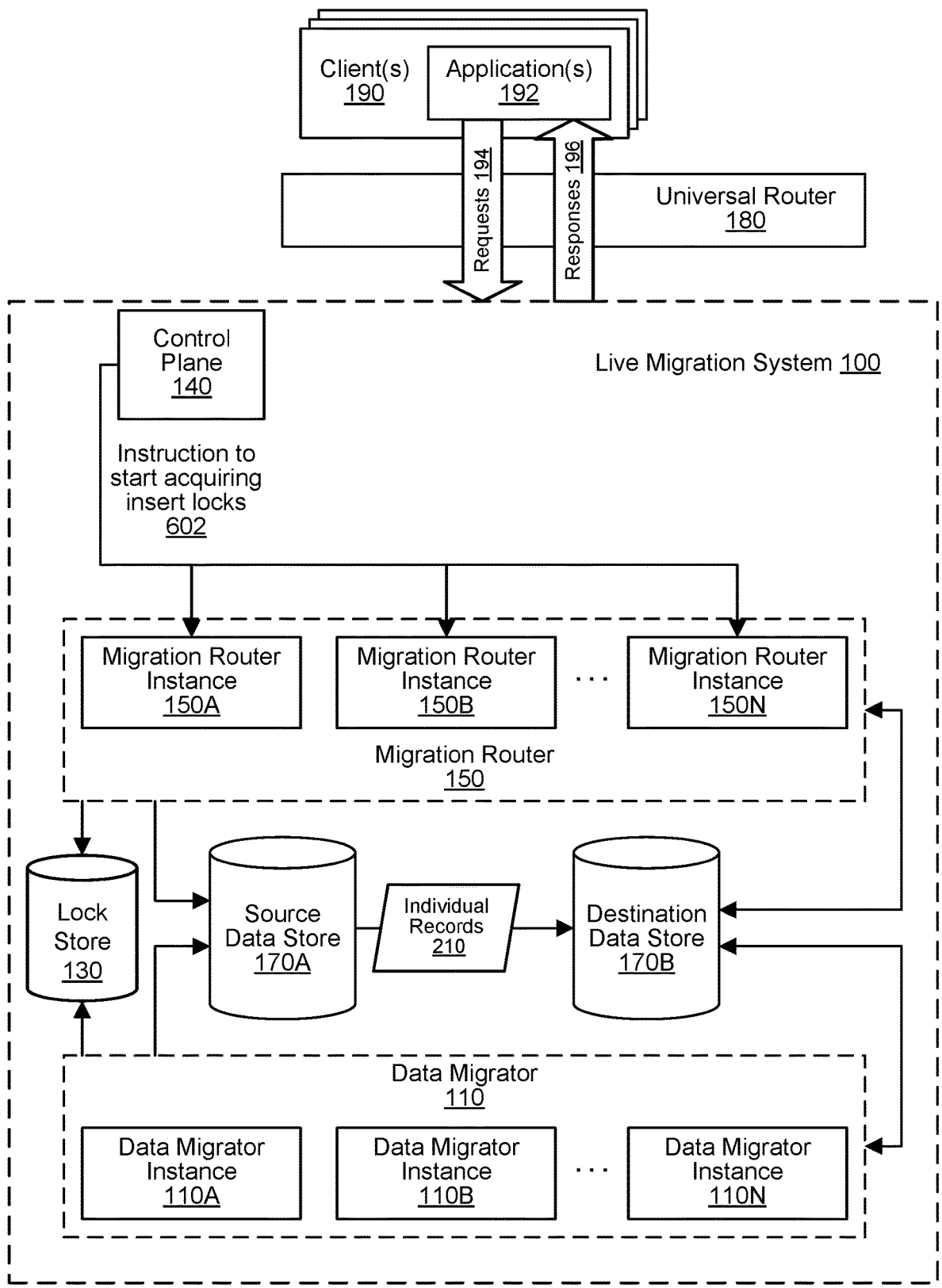
FIGS. 6A-6E illustrate propagation of a treatment configuration update to migration router instances, according to some embodiments.

In FIG. 6A, in order to begin an update of insert treatment configurations stored by migration router instances 150A and 150B through 150N, control plane 140 provides instructions 602 to the migration router instances 150A and 150B through 150N to start acquiring insert locks for subsequently received requests to insert a record.

Figure 6B:
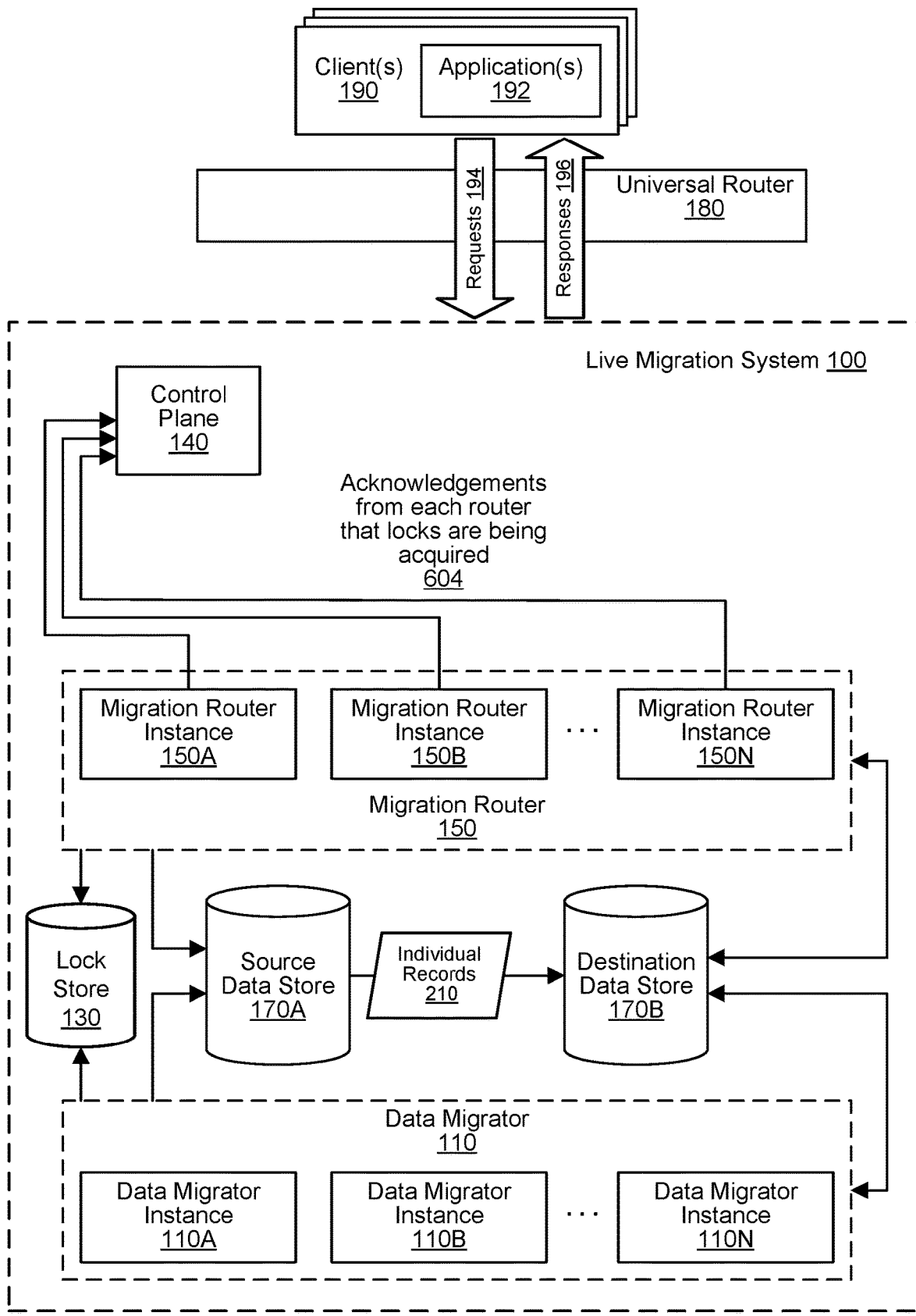

In FIG. 6B, subsequent to completing any pending threads that were begun without acquiring an insert lock, the migration router instances 150A and 150B through 150N each acknowledge 604 to the control plane 140 that the respective migration router instances have applied the instruction 602 to acquire insert locks for requests to insert a record.

Figure 6C:
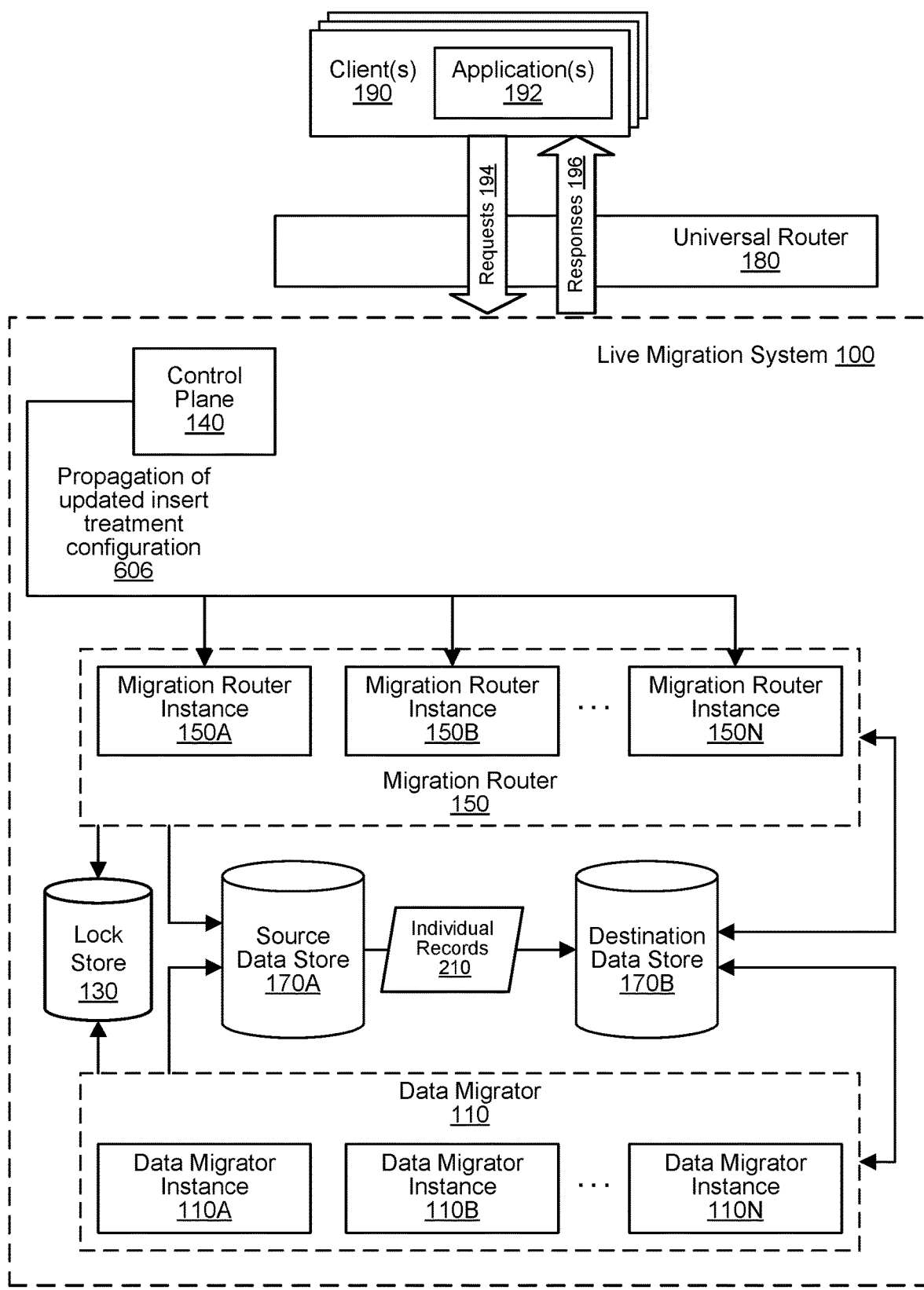

In FIG. 6C, in response to receiving acknowledgements from the full fleet of migration router instances 150A through 150N that the migration router instances have applied the instruction to acquire insert locks, the control plane 140 propagates an updated insert treatment configuration 606 to each of the migration router instances 150A through 150N.

Figure 6D:
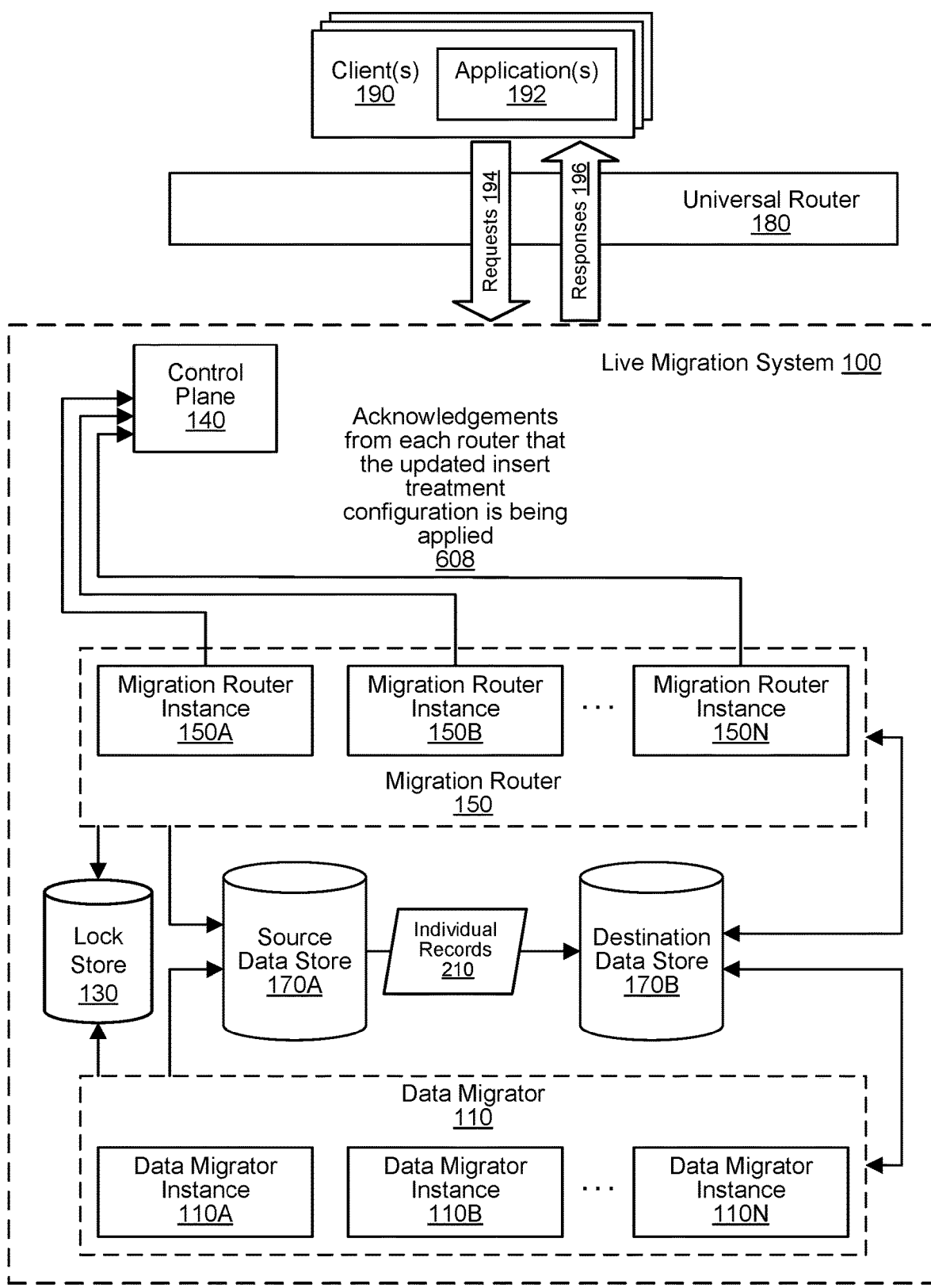

In FIG. 6D, subsequent to completing any outstanding threads using the previous insert treatment configuration, the migration router instances 150A and 150B through 150N start applying the updated insert treatment configuration propagated at 606. Also, once the migration router instances 150A and 150B through 150N have started applying the updated insert treatment configuration, the migration router instances 150A through 150N each provide respective acknowledgments 608 to control plane 140 that the updated insert treatment configuration has been applied.

Figure 6E:
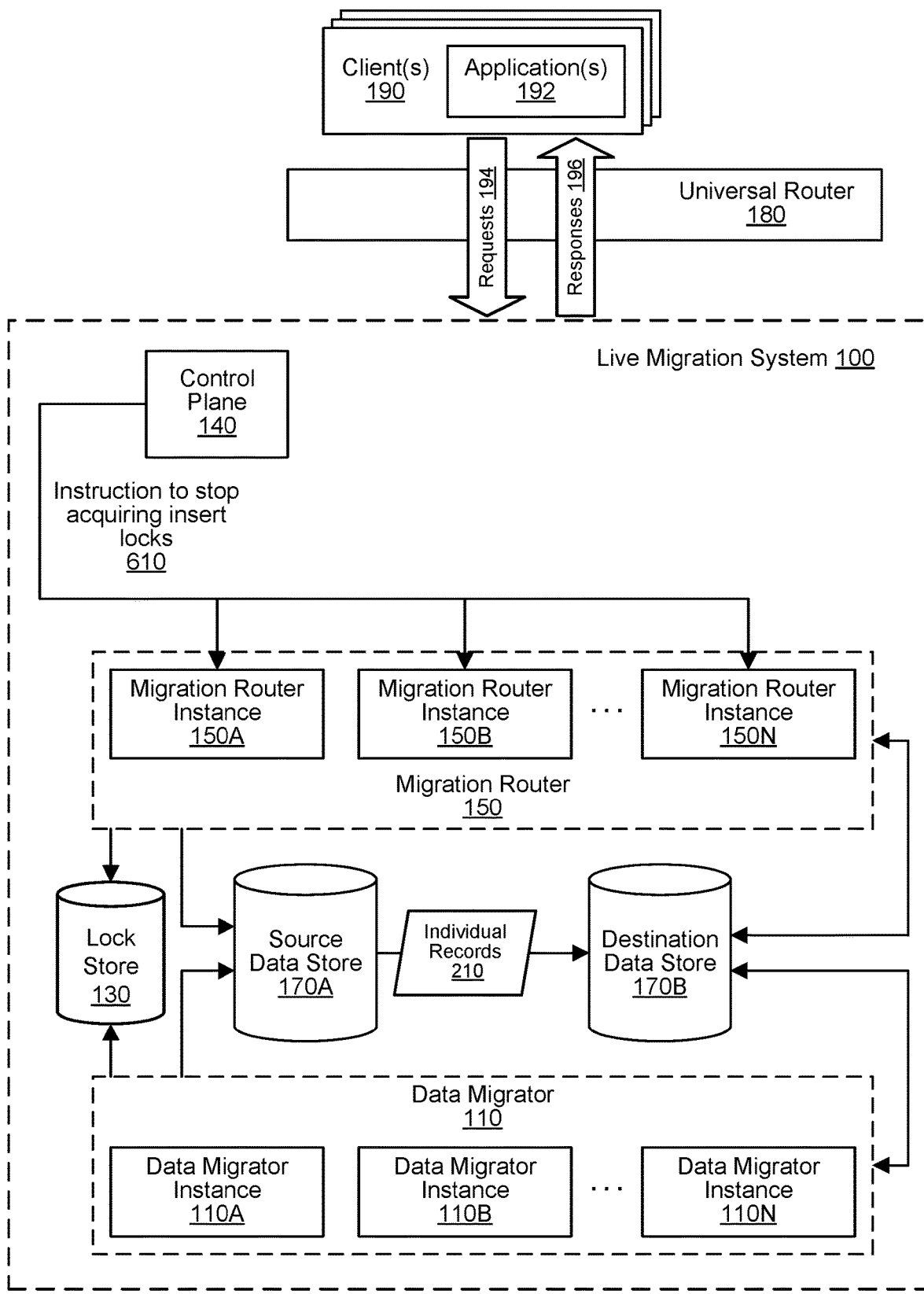

In FIG. 6E, once acknowledgements have been received from each migration router instance in the fleet of migration router instances 150A through 150N that the updated insert treatment configuration has been applied, the control plane 140 provides an instruction 610 to the migration router instances 150A through 150N to stop acquiring insert locks. At this point the migration router 150 implemented using migration router instances 150A and 150B through 150N has been successfully transitioned to the updated insert treatment configuration.

Figure 7:
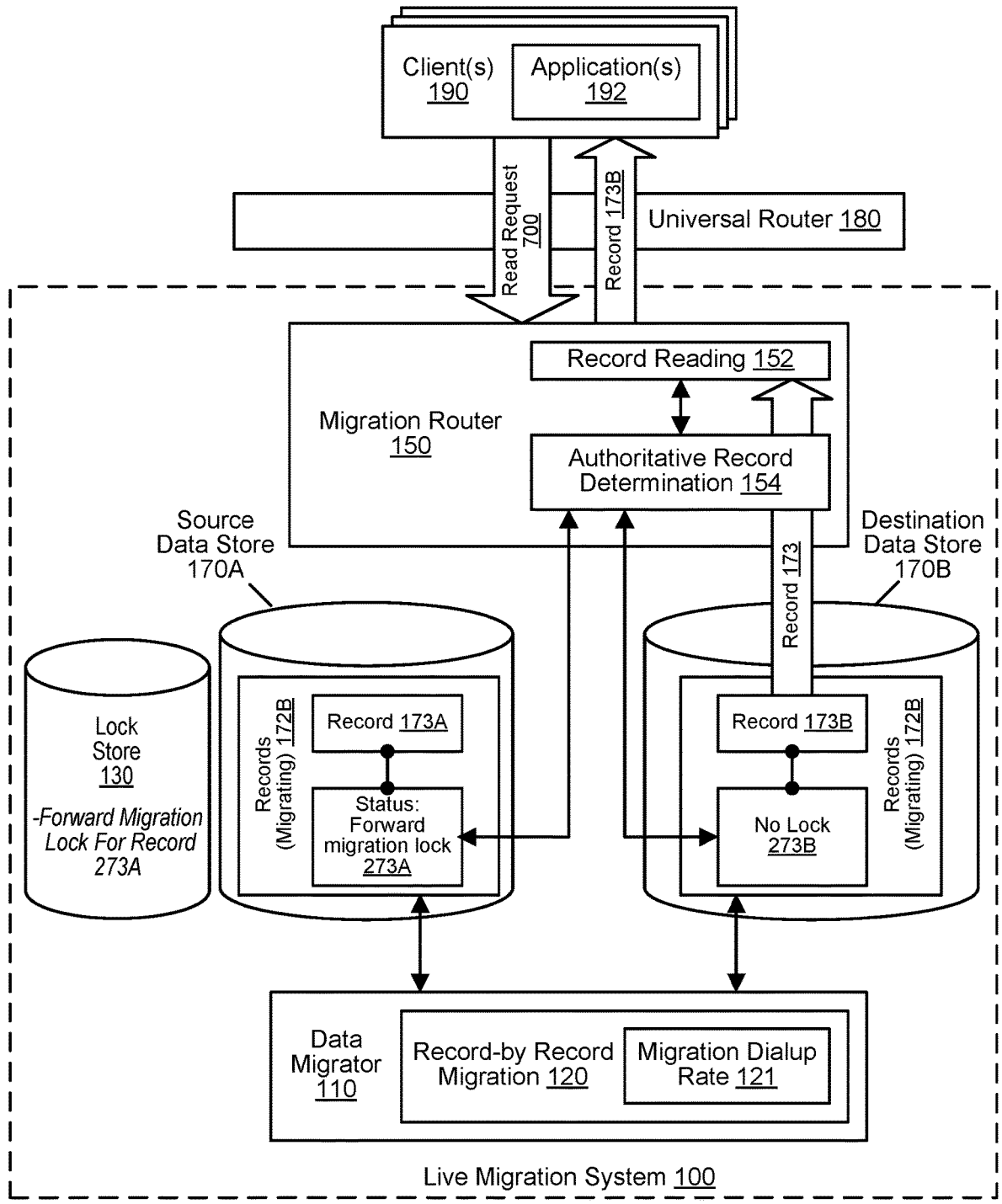
FIG. 7 illustrates a migration router instance responding to a read request during a record-by-record live migration, according to some embodiments.

FIG. 7 illustrates a migration router instance responding to a read request during a record-by-record live migration, according to some embodiments.

During the record-by-record migration 120, the migration router 150 may accept data access requests 194 such as read request 700. The read request 700 may represent a request for a client to obtain a record associated with a particular key and belonging to the segment 172B currently being migrated. To perform the requested record reading 152, the migration router 150 may use a component for authoritative record determination 154 to determine whether the authoritative instance of the record is in the source 170A or destination 170B and return that authoritative instance to the requesting client. The authoritative instance may be determined based (at least in part) on whether a lock has been obtained by the migration router 150. For example, as shown in FIG. 7, at the point in the record-by-record migration 120 when the read request 700 is processed, the record 173A in the source 170A may have an associated forward migration lock 273A and the record 173B in the destination 170B may not have an associated reverse migration lock. Accordingly, the authoritative record determination 154 may determine that the destination instance is authoritative. Accordingly, as shown in FIG. 7, the migration router 150 may return the destination instance 173B to the client(s) 190 as the authoritative instance of the requested record. In some embodiments, an authoritative record determination module 154 may know a migration direction of on ongoing migration (e.g. forward or reverse) and may simply read both the source and destination data store to determine an authoritative instance of a requested record, without examining locks. For example, in a forward migration the presence of an instance of the record in the destination data store may indicate that the record has already been migrated and that the instance in the destination data store is the authoritative instance of the record.

Figure 8:
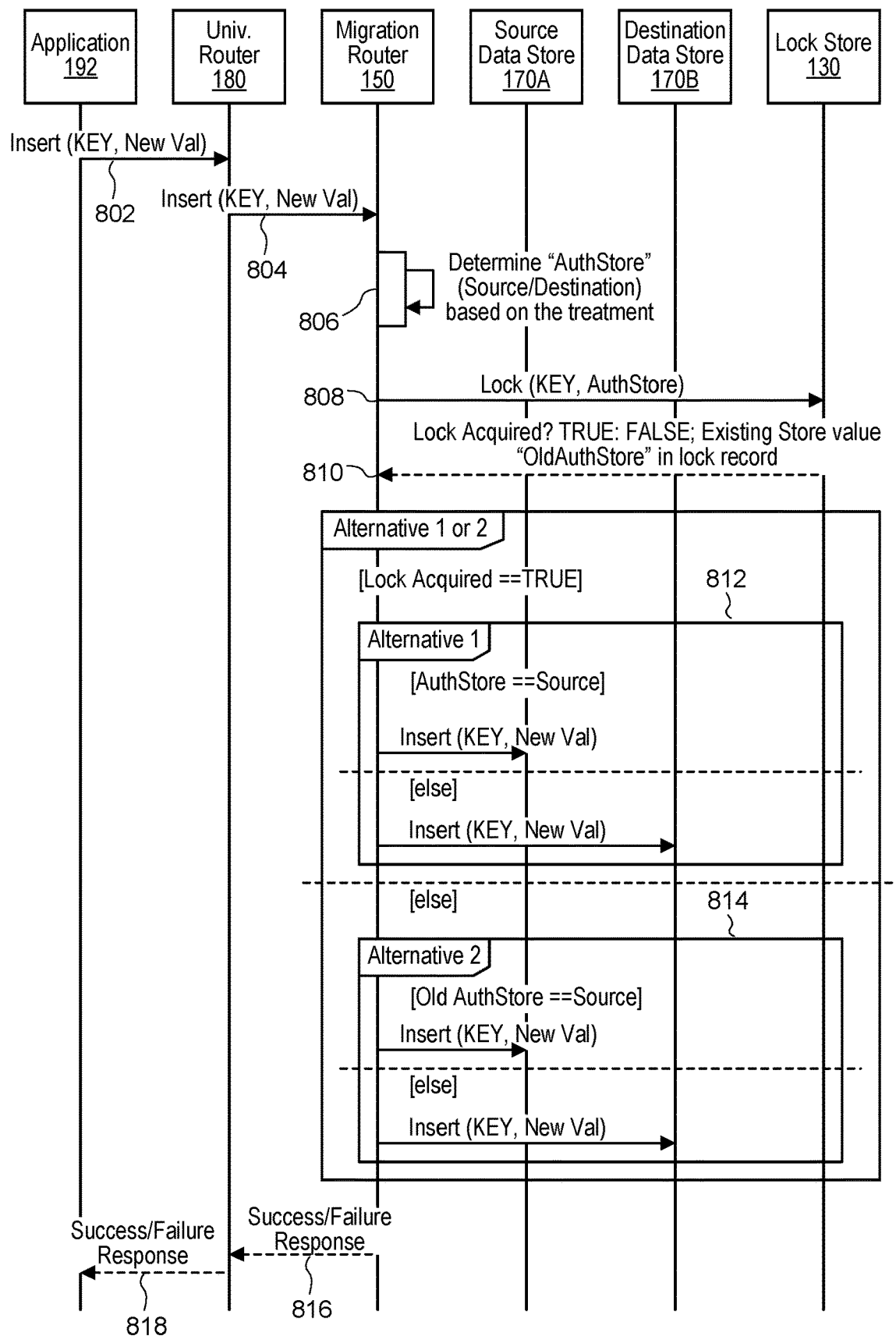
FIG. 8 illustrates interactions between components of an example system environment for record-by-record live migration using a lock store, including responding to a record insertion request during the record-by-record live migration, according to some embodiments.

FIG. 8 illustrates interactions between components of an example system environment for record-by-record live migration using a lock store, including responding to a record insertion request during the record-by-record live migration, according to some embodiments.

At 802 universal router 180 receives an insert request to insert a new record from application 192, wherein the insert request specifies a key for the record to be inserted and a new value for the record to be inserted. At 804, the universal router 180, routes the insert request to one of a fleet of migration router instances of migration router 150 to perform the insert. At 806, the migration router 150 determines an authoritative store for inserting the requested record based on a currently stored insert treatment configuration of the migration router instance. For example, the migration router instance may apply a hash function to the key specified in the insert request and compare the result of the hash function to a current insert treatment configuration stored by the migration router instance to determine if the requested record is to be inserted into the source data store or the destination data store.

At 808, the migration router instance attempts to acquire an insert lock from lock store 130, wherein the request to acquire the insert lock specifies the key of the record to be inserted and the determined authoritative store into which the record is to be inserted.

At 810, the lock store 130 provides an indication to the migration router instance as to whether or not the requested insert lock has been acquired. If the requested insert lock is not acquired, the lock store 130 provides the migration router instance with an indication of a determined location (e.g. authoritative store) already determined for the key and included in metadata with an insert lock already issued for the requested key.

If the lock acquisition is successful, at 812 the migration router instance inserts the requested record with the specified key and value into the authoritative data store determined at 806.

If the lock acquisition is not successful, at 814 the migration router instance inserts the requested record with the specified key and value into the authoritative data store indicated in the response from the lock store at 810.

At 816, the migration router instance provides an indication to the universal router 180 as to whether the insert operation was successful. Likewise, at 818 the universal router provides an indication to application 192 as to whether the insert operation was successful.

Figure 9:
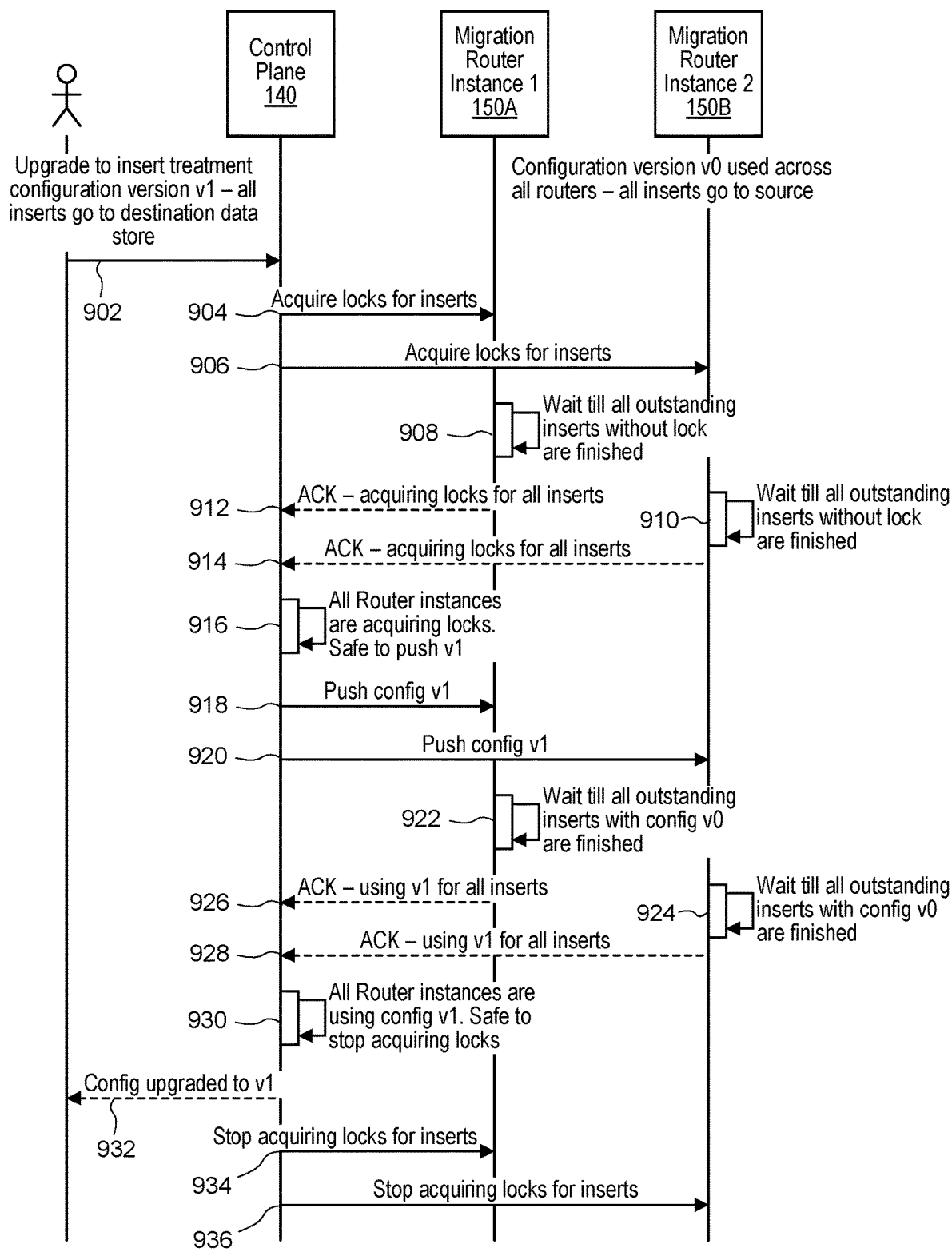
FIG. 9 illustrates interactions between components of an example system environment for record-by-record live migration using a lock store, including transitioning into and out of a process for propagating insert treatment configuration updates to migration router instances, according to some embodiments.

FIG. 9 illustrates interactions between components of an example system environment for record-by-record live migration using a lock store, including transitioning into and out of a process for propagating insert treatment configuration updates to migration router instances, according to some embodiments.

At 902 an administrator provides an instruction to the control plane 140 to update the inset treatment configuration currently being used by a fleet of migration router instances to a next version of the insert treatment configuration. For example, the update may incrementally dial up the ratio of inserts that are directed to the destination data store, or may instruct that all future inserts are to be directed to the destination data store. Also, the insert treatment configuration update may dial down the ratio of inserts that are to be directed to the destination data store, such as incrementally reducing the percentage of incoming insert requests that are performed at the destination data store. In some embodiments, the administrator may be a person that is monitoring the live migration or may be a software application that is monitoring the performance of the live migration. In some embodiments, the administrator may be a software component of the record-by-record live migration system that uses a lock store.

To begin the insert treatment configuration update process, at 904 and 906, the control plane 140 instructs all migration router instances, in a fleet of migration router instances implementing migration router 150, to start acquiring insert locks for any subsequently received requests to insert a record. At 908 and 910 each migration router instance completes any insertion threads that were begun before receiving the instruction to acquire insert locks and that were performed without acquiring insert locks.

At 912 and 914, the control plane 140 receives acknowledgments from the migration router instances of the fleet that the migration router instances are acquiring locks for all inserts. At 916, the control plane 140 verifies that acknowledgements have been received from all migration router instances of the fleet. Thus, the control plane 140 determines that it is now safe to push the updated insert treatment configuration to the migration router instances of the fleet.

At 918 and 920, the control plane 140 pushes the updated insert treatment configuration to each of the migration router instances of the fleet. At 922 and 924, each of the migration router instances completes any outstanding insertion threads begun prior to receiving the updated insert treatment configuration, wherein the outstanding insertion threads used the previous insert treatment configuration. At 926 and 928 each of the migration router instances sends an acknowledgement to control plane 140 that the new insert treatment configuration is now being applied. At 930, the control plane 140 verifies that acknowledgements have been received from each migration router instance in the fleet, wherein the acknowledgements indicate that the updated insert treatment configuration is being applied.

At 932, the control plane informs the administrator that the updated insert treatment configuration has been applied. Also, at 934 and 936 the control pane 140 instructs the migration router instances of the fleet that it is no longer necessary to acquire insert locks (at least until the next insert treatment configuration update is propagated).

Figure 10A:
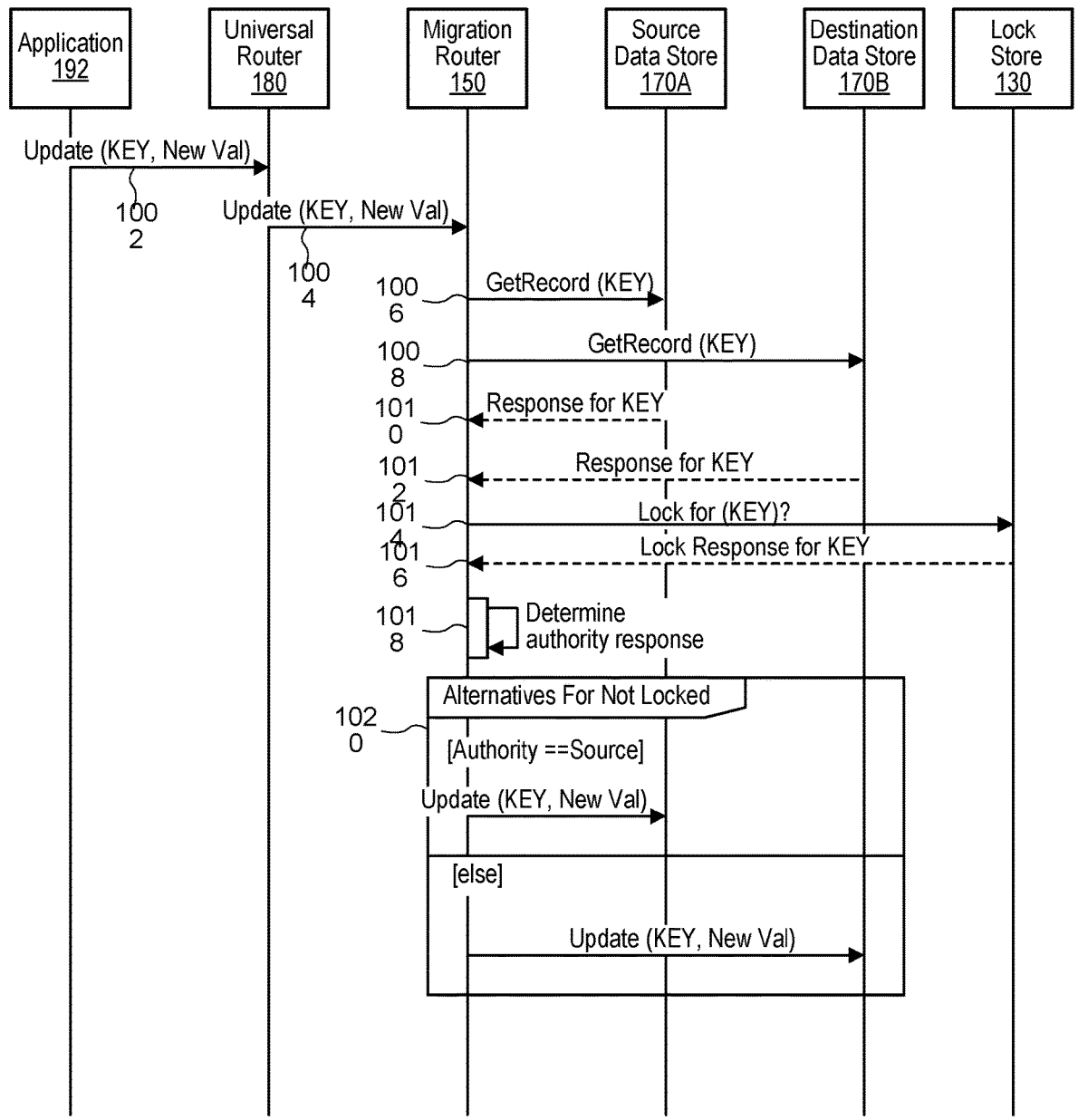
FIGS. 10A and 10B illustrate interactions between components of an example system environment for record-by-record live migration using a lock store, including a migration router instance responding to an update request received during the record-by-record live migration, according to some embodiments.
Figure 10B:
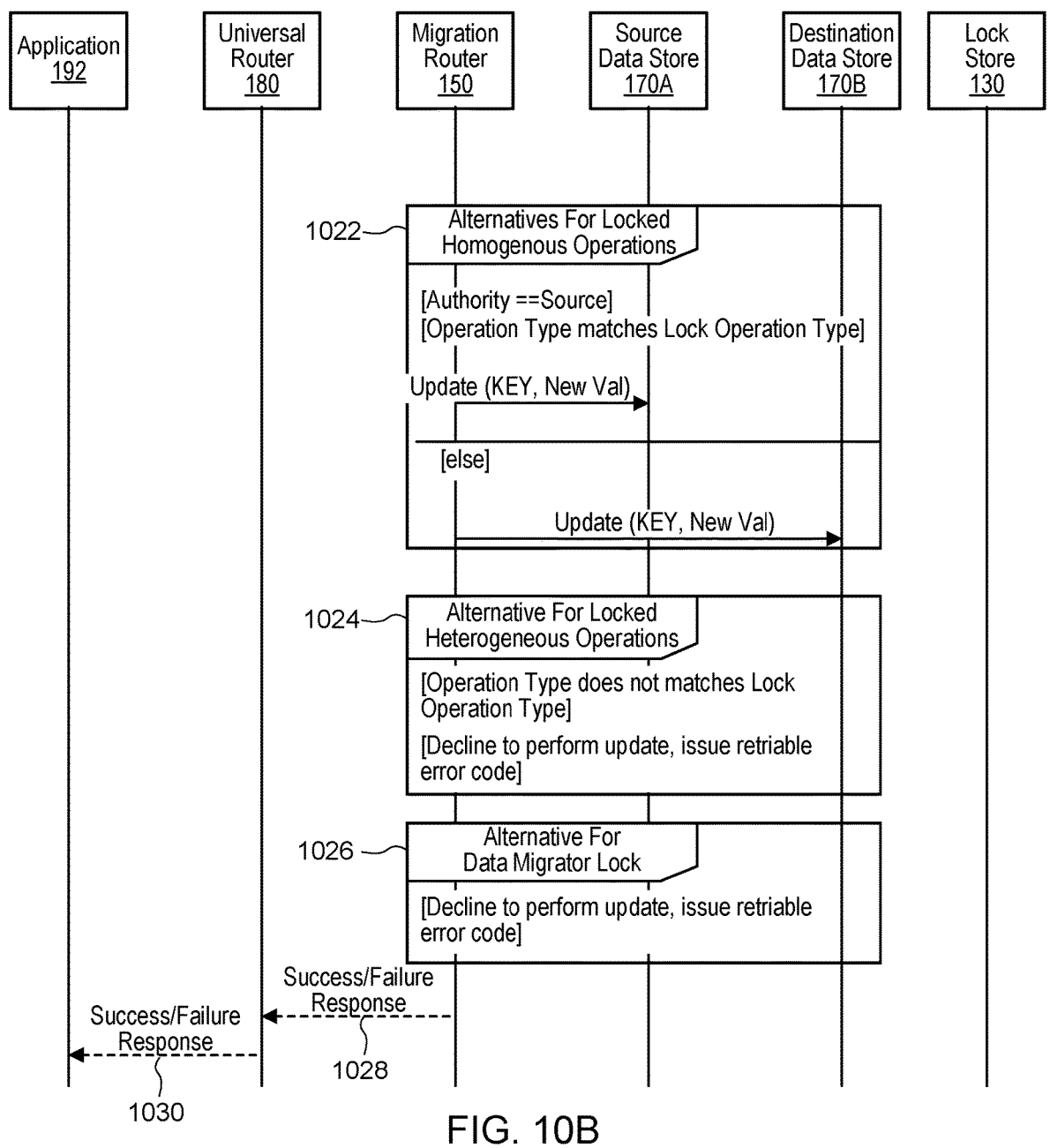

FIGS. 10A and 10B illustrate interactions between components of an example system environment for record-by-record live migration using a lock store, including a migration router instance responding to an update request received during the record-by-record live migration, according to some embodiments.

At 1002, application 192 sends an update request to universal router 180, wherein the update request specifies a key for a record to be updated and a new value for the record to be updated. At 1004, the universal router 180 routes the request to one of a plurality of migration router instances that implement migration router 150.

At 1006 and 1008 the migration router instance attempts to read the record having the specified key from the source data store 170A and the destination data store 170B. This is done to determine if an instance of the record is stored in the source data store, the destination data store, or both. At 1010 and 1012 the migration router instance receives responses from the source and destination data stores in response to the reads sent at 1006 and 1008. At 1014, the migration router instance also inquires to the lock store 130 as to whether there are any current update locks or migration locks stored for the key associated with the update request. At 1016, the migration router instance receives a response from the lock store indicating whether there are any currently valid locks for the key. At 1018, based on the responses received at 1010, 1012, and 1016, the migration router instance determines an authoritative version of the record.

At 1020, if there is not a currently valid lock for the key associated with the update request, the migration router instance performs the update operation at the instance of the record (either source or destination) that was determined to be the authoritative instance of the record.

If there is a currently valid update lock for the key, wherein another migration router instance has acquired the update lock, the migration router instance servicing the request determines whether the request is a homogenous operation (e.g. a same type of operation for which the outstanding valid lock was acquired by the other migration router instance), or if the request is for a heterogeneous operation (e.g. an operation that differs in type from the operation for which the outstanding valid lock was acquired by the other migration router instance).

If the requested update operation is a homogenous operation, at 1022 the migration router instance performs the update operation at the instance of the record determined to be authoritative (e.g. the source or destination). For example, homogenous operations may be two write requests or two delete requests directed to the same key.

If the requested update operation is heterogeneous, at 1024 the migration router instance declines to perform the requested update operation and provides the universal router 180 with a retriable error code that may be routed to application 192.

If there is an existing valid migration lock for the key associated with the requested update operation and a copy of the record is not stored in the destination data store to which the migration direction is directed, then, at 1026, the migration router instance declines to perform the requested update operation and provides the universal router 180 with a retriable error code that may be routed to application 192. In some embodiments, if the record has already been migrated to a location in the direction of the migration, the update may be performed prior to the migration lock being released. For example, in a forward migration from the source data store to the destination data store, if the record has already been copied to the destination data store, but the migration lock has not yet been deleted for the record, the update may be allowed to proceed. However, if the migration direction is in the process of being reversed, the update operation may fail, because it would not be clear if the record has already been migrated back to the source data store, as an example.

At 1028, the migration router instance provides the universal router 180 with a response indicating whether the requested update operation succeeded or failed. Also, at 1030 the universal router routes the response to the application 192.

Figure 11:
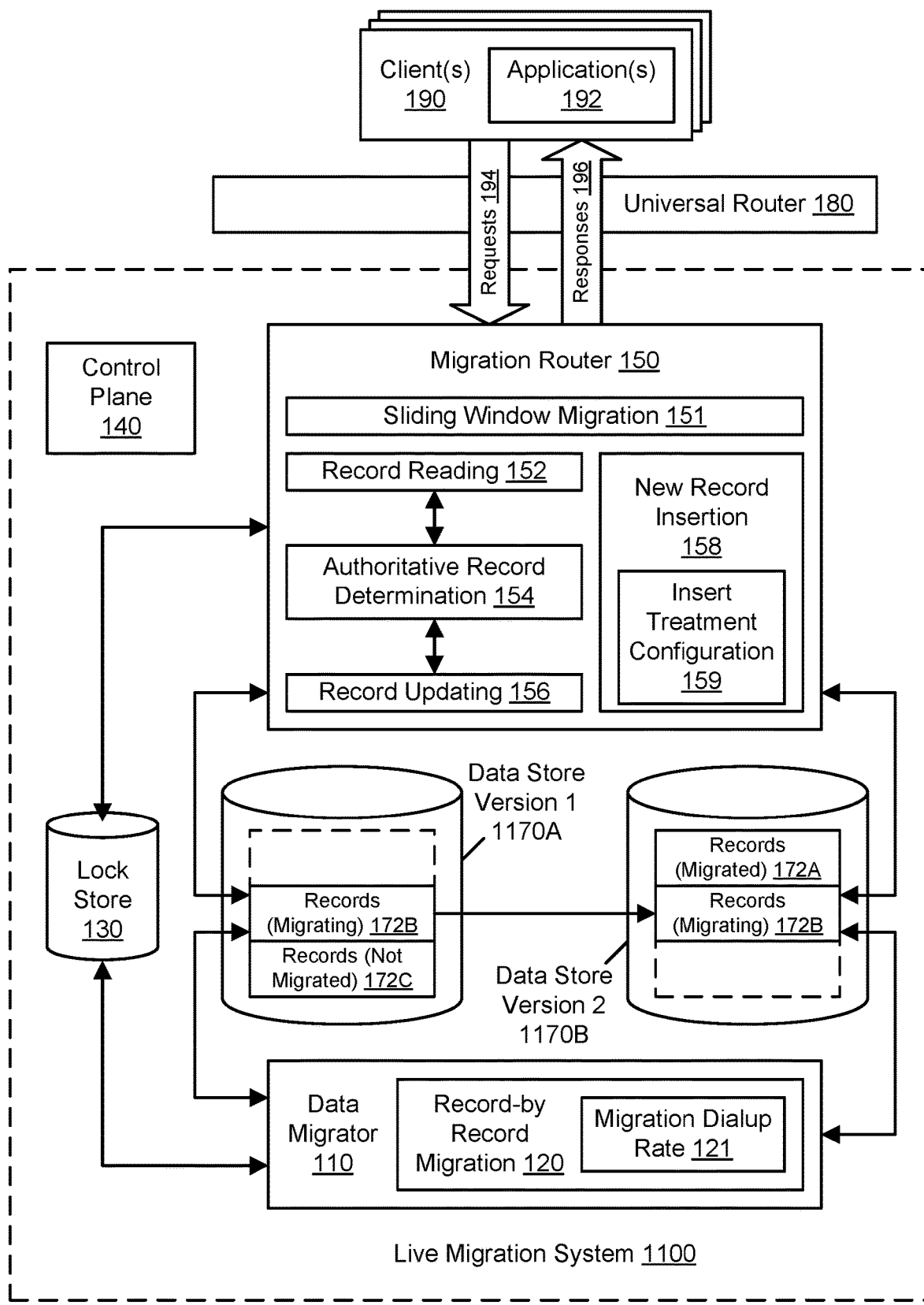
FIG. 11 illustrates an example system environment for record-by-record live migration between nodes of different configurations of a single data store, according to some embodiments.

FIG. 11 illustrates an example system environment for record-by-record live migration between nodes of different configurations of a single data store, according to some embodiments.

FIG. 11 illustrates live migration system 1100, which includes similar components as live migration system 100 described herein. Except instead of a source data store and a destination data store, live migration system 1100 includes two versions of the same data store, e.g. data store version 1 1170A and data store version 2 1170B. In some embodiments, a data store may be scaled up or down. For example, nodes may be added to a data store or removed from the data store. The scaling of the data store may necessitate a redistribution of records between the nodes of the data store. In such situations a live migration system as described herein may be used to migrate records one-by-one between nodes of the scaled up or scaled down version of the data store while continuing to process operations directed at the data store, such as reads, writes, inserts, and deletes. For example, live migration system 1100 may service reads, writes, inserts, and deletes while migrating records between different scaled versions of a data store, such as version 1 1170A and version 2 11170B.

Figure 12:
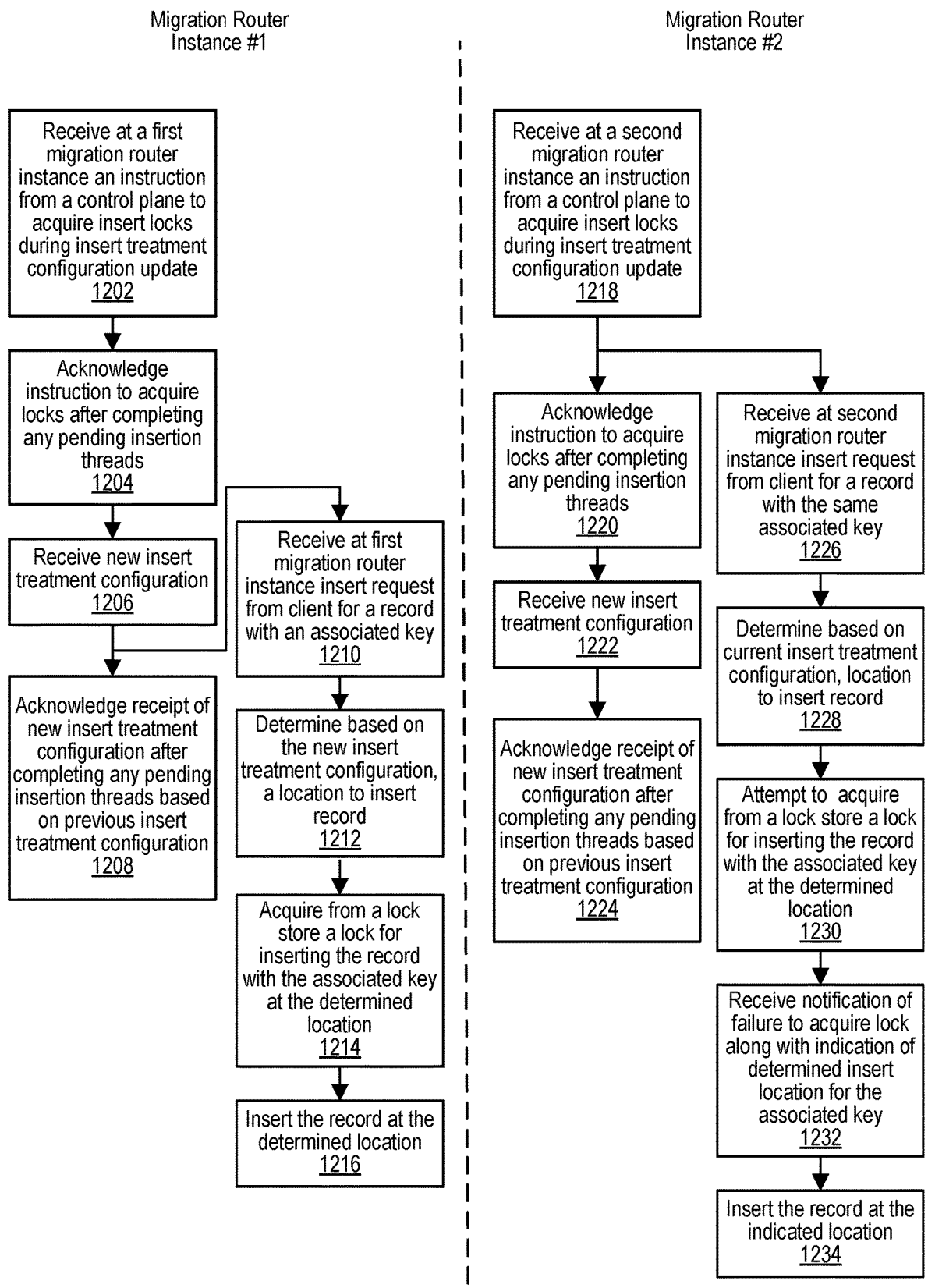
FIG. 12 is a flowchart illustrating a method for inserting records in the example system using distributed migration router instances during a record-by-record live migration of a data set, according to some embodiments.

FIG. 12 is a flowchart illustrating a method for inserting records in the example system using distributed migration router instances during a record-by-record live migration of a data set, according to some embodiments.

At 1202 a first migration router instance receives an instruction from a control plane to acquire insert locks during an insert treatment configuration update.

At 1204, the first migration router instance acknowledges the instruction to acquire locks to the control plane after completing any pending insertion threads.

At 1206, the first migration router instance receives a new/updated insert treatment configuration from the control plane.

At 1210, subsequent to receiving the new/updated insert treatment configuration, the first migration router instance receives a request to insert a record. At 1208, the first migration router instance proceeds to acknowledge the receipt of the new/updated insert treatment configuration to the control plane after completing any pending insertion threads that were performed based on a previous version of the insert treatment configuration.

At 1212, the first migration router instance determines a location to insert the record based on the new insert treatment configuration received at 1206.

At 1214, the first migration router instance acquires an insert lock from a lock store for inserting the record at the location determined at 1212. The lock store stores the location determined at 1212 with the insert lock.

At 1216, the first migration router instance inserts the record at the location determined at 1212.

At 1218, a second migration router instance receives an instruction from the control plane to acquire insert locks during the insert treatment configuration update.

At 1226, the second migration router instance receives an insert request to insert a record with the same key as the record inserted by the first migration router instance at 1216. The request is received after the second migration router instance receives the instruction to acquire insert locks, but before the second migration router instance receives the new/updated insert treatment configuration at 1222. In a similar manner as the first migration router instance, the second migration router instance, at 1220, acknowledges the instruction to acquire insert locks after completing any pending insertion threads performed without acquiring insert locks. Because the second migration router instance received the insert request at 1226 after receiving the instruction to acquire insert locks, the second migration router instance acquires insert locks for the requested insertion.

At 1222, the second migration router instance receives the new/updated insert treatment configuration after receiving the insert request at 1226. At 1224, the second migration router instance acknowledges receipt of the new/updated insert treatment configuration after completing any pending insertion threads based on the previous insert treatment configuration, such as the insertion received at 1226.

At 1228, the second migration router determines an insert location for the record to be inserted based on the currently stored insert treatment configuration (which does not yet reflect the update that will be received at 1222).

At 1230, the second migration router instance attempts to acquire an insert lock for the key associated with the insert request received at 1226. However, because an insert key has already been stored for the first migration router instance, e.g. at 1214, the insert lock acquisition fails. Thus, at 1232 the second migration router instance receives a notification that the insert lock acquisition has failed and also receives an indication of the determined location stored with the existing insert lock, e.g. the insert location determined by the first migration router instance at 1212.

At 1234, the second migration router instance inserts the record/writes the value included with the insert request to the location indicated in the response from the lock store at 1232. As can be seen this process prevents the two migration router instances form inserting two records with the same key in different data stores during an insert treatment configuration update.

Figure 13:
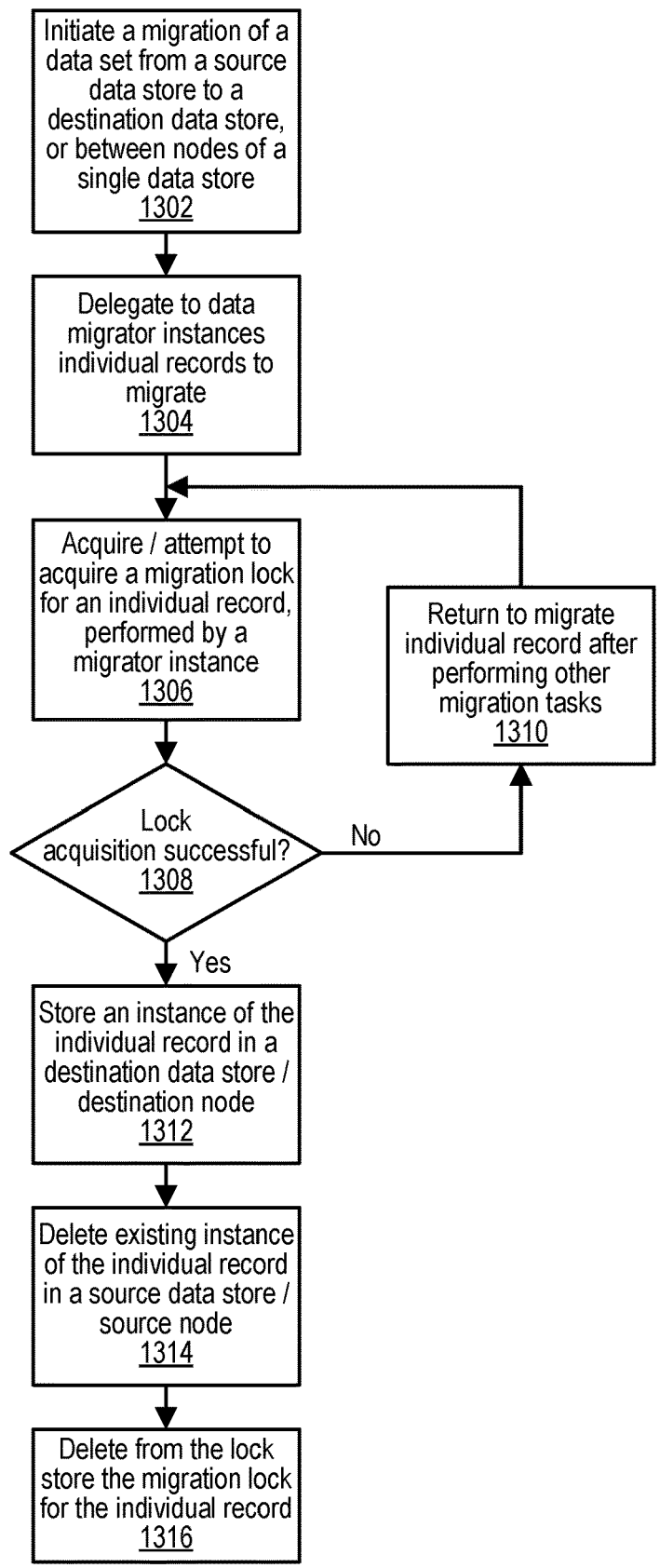
FIG. 13 is a flowchart illustrating a method of migrating records using a migrator instance of an example system for record-by-record live migration using a lock store, according to some embodiments.

FIG. 13 is a flowchart illustrating a method of migrating records using a migrator instance of an example system for record-by-record live migration using a lock store, according to some embodiments.

At 1302, a data migrator initiates a migration of a data set from a source data store (or a first version of a data store) to a destination data store (or a second version of the same data store).

At 1304, the data migrator delegates migration tasks to migrate individual records to migration workers, also referred to herein as data migrator instances.

At 1306, a data migrator instance acquires or attempts to acquire a migration lock (either forward or reverse) from a lock store for an individual record delegated to the data migrator instance to migrate. If the attempt to acquire the migration lock is determined to be unsuccessful at 1308, the data migrator instance proceeds to migrate other records and, at 1310, returns to the particular record and performs another attempt to acquire a migration lock for the particular record.

If the attempt to acquire the migration lock is determined to be successful at 1308, at 1312 the data migrator instance stores an instance of the record being migrated to the destination data store (or a node of the second version of the data store).

At 1314, the data migrator instance deletes the instance of the record being migrated from the source data store (or the node of the first version of the data store).

At 1316, the data migrator instance deletes or otherwise causes the migration lock to be released from the lock store for the key associated with the individual record being migrated.

Figure 14:
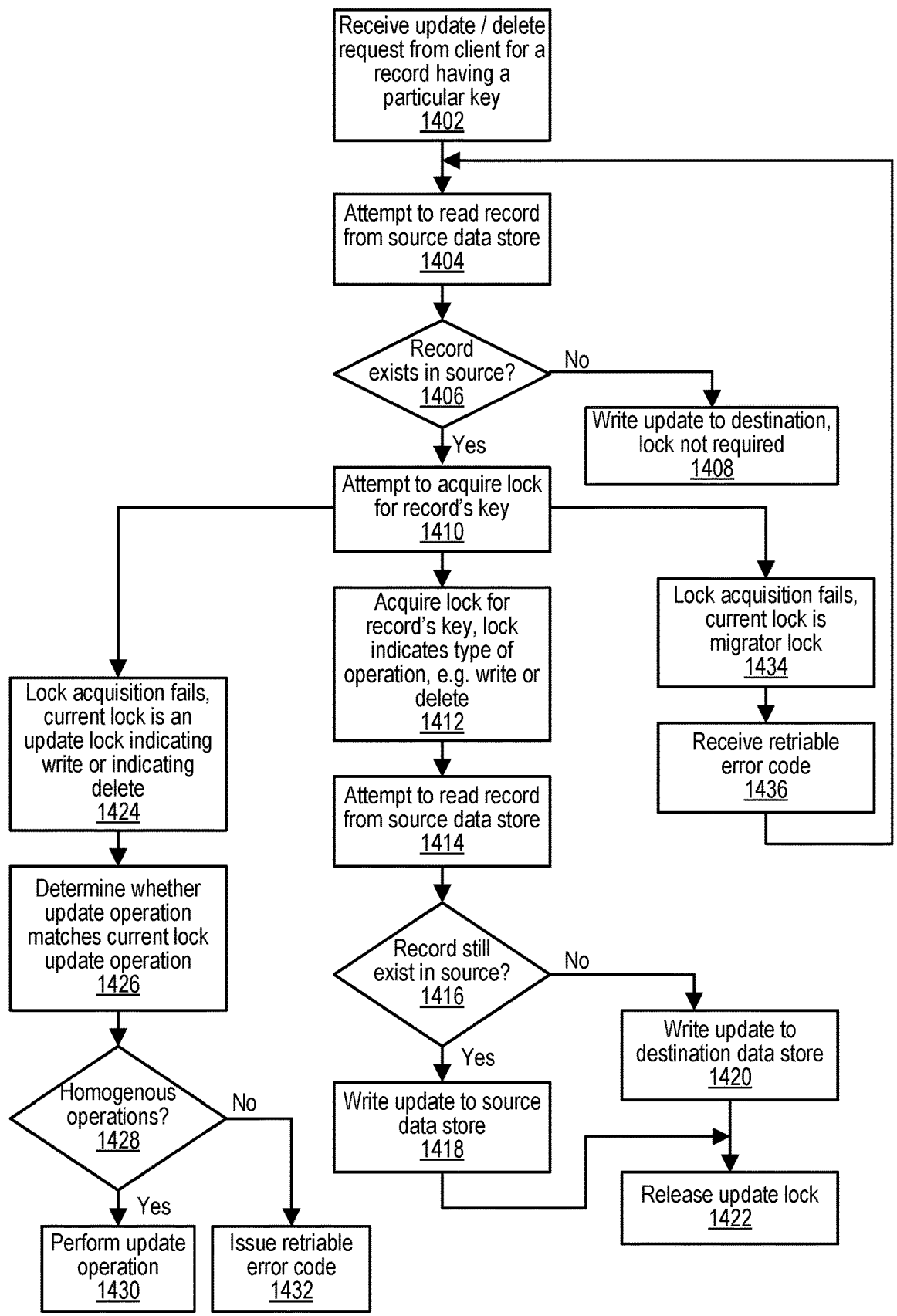
FIG. 14 is a flowchart illustrating a method for updating records using distributed migration router instances during a record-by-record live migration of a data set, according to some embodiments.

FIG. 14 is a flowchart illustrating a method for updating records using distributed migration router instances during a record-by-record live migration of a data set, according to some embodiments.

At 1402, a migration router instance receives an update request (e.g. a write or delete request) to be performed on a record having a particular key, wherein the record is included in a segment of a data store that is being migrated.

At 1404, the migration router instance attempts to read the record from a source data store. At 1406, based on the success of the read attempt it is determined whether the record exists in the source data store. If the record does not exist in the source data store, but does exist in the destination data store, at 1408 the migration router instance writes the update to the record in the destination data store or performs the delete operation on the record in the destination data store. Note that in a reverse migration, after completing a transition in migration direction, a migration router instance may treat the original source data store as a destination data store and may treat the original destination data store as a source data store, for example at 1408 and 1410.

If a record for the key exists in the source data store, at 1410 the migration router instance attempts to acquire a write lock or a delete lock from the lock store for the key associated with the record to be updated.

At 1412, if a write lock or a delete lock is acquired at 1412, then at 1414 the migration router instance attempts to read the record from both the source data store and the destination data store. At 1416, the migration router instance determines if the record still exists in the source data store. If not, at 1420, the migration router instance writes the update/performs the delete at the destination data store. If the record exists in the source data store (and a write/delete lock has been issued to the migration router instance) the migration router instance, at 1418 writes the update/performs the delete at the source data store. At 1422, the migration router instance deletes/releases the update/delete lock stored at the lock store.

At 1424, the migration router instance receives an indication that the lock acquisition has failed and receives an indication that a currently valid lock for the key associated with the record is a write lock or a delete lock. Then, at 1426 and 1428, the migration router instance determines whether the update operation requested at 1402 is a homogenous operation with the currently valid write lock or delete lock. If the operations are homogenous (e.g. both writes or both deletes), the migration router instance performs the requested operation at 1430, otherwise, at 1432, the migration router instance issues a retriable error code.

At 1434, the migration router instance receives an indication that the attempt to acquire the write lock or the delete lock has failed and that there is a currently valid migration lock for the key associated with the record. In response, at 1436, the migration router instance issues a retriable error code, and may optionally repeat the process after waiting some amount of time to allow for the migration to complete.

Illustrative Computer System

In at least some embodiments, a computer system that implements a portion or all of one or more of the technologies described herein may include a computer system that includes or is configured to access one or more computer-readable media. FIG. 15 illustrates such a computing device 1500. In the illustrated embodiment, computing device 1500 includes one or more processors 1510A-1510N coupled to a system memory 1520 via an input/output (I/O) interface 1530. Computing device 1500 further includes a network interface 1540 coupled to I/O interface 1530.

In various embodiments, computing device 1500 may be a uniprocessor system including one processor or a multiprocessor system including several processors 1510A-1510N (e.g., two, four, eight, or another suitable number). Processors 1510A-1510N may include any suitable processors capable of executing instructions. For example, in various embodiments, processors 1510A-1510N may be processors implementing any of a variety of instruction set architectures (ISAs), such as the x86, PowerPC, SPARC, or MIPS ISAs, or any other suitable ISA. In multiprocessor systems, each of processors 1510A-1510N may commonly, but not necessarily, implement the same ISA.

System memory 1520 may be configured to store program instructions and data accessible by processor(s) 1510A-1510N. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code (i.e., program instructions) 1525 and data 1526.

In one embodiment, I/O interface 1530 may be configured to coordinate I/O traffic between processors 1510A-1510N, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processors 1510A-1510N). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processors 1510A-1510N.

Network interface 1540 may be configured to allow data to be exchanged between computing device 1500 and other devices 1560 attached to a network or networks 1550. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1500 via I/O interface 1530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 1500 as system memory 1520 or another type of memory. Further, a computer-readable medium may include transmission media or signals such as electrical, electromagnetic, or digital signals, conveyed via a communication medium such as a network and/or a wireless link, such as may be implemented via network interface 1540. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a source data store;
a destination data store;
a lock store;
one or more computing devices configured to implement a data migrator, wherein the data migrator is configured to:
  initiate a migration of a data set from the source data store to the destination data store, wherein the data set comprises a plurality of records, wherein for an individual record, the data migrator is configured to:
    acquire, from the lock store, a lock indicating that the individual record is being migrated from the source data store to the destination data store;
    store, in the destination data store, an instance of the individual record;
    delete, in the source data store, a previously stored instance of the individual record; and
    delete, from the lock store, the lock indicating that the individual record is being migrated from the source data store to the destination data store; and
one or more computing devices configured to implement a migration router, wherein the migration router is configured to:
  for the individual record:
    receive, during the migration, from a client, an update request for the individual record;
    attempt to acquire, from the lock store, a lock indicating that the individual record is to be updated; and
    receive, from the lock store, a retriable error indicating that the attempt to acquire the lock has failed due to the lock for the individual record already having been acquired by the data migrator; and
  for an additional individual record to be inserted in the system:
    receive, from the client, during the migration, a request to insert the additional individual record;
    determine, based on an insert treatment configuration stored by the migration router, a location to insert the additional individual record, wherein the determined location is in the source data store or in the destination data store;
    acquire, from the lock store, a lock indicating that the additional individual record is being inserted at the determined location; and
    insert the additional individual record in the determined location,
  wherein for subsequent insert requests for the additional individual record received during the migration, the lock store is configured to:
    decline to issue a lock and instead provide the determined location for the additional individual record associated with the lock acquired by the migration router.

2. The system of claim 1, further comprising:
one or more computing devices configured to implement an additional migration router, wherein the migration router and the additional migration router function as migration router instances of a distributed migration router for the system; and
one or more computing devices configured to implement a control plane for the migration router and the additional migration router,
wherein the control plane is configured to:
  prior to propagating an insert treatment configuration update to the migration router and the additional migration router, instruct the migration router and the additional migration router to acquire insertion locks for subsequently received requests to insert records;
receive from the migration router and the additional migration router respective acknowledgments that the migration router and the additional migration router are acquiring locks for requests to insert records;
propagate to the migration router and the additional migration router the insert treatment configuration update, wherein the insert treatment configuration update changes respective proportions of requests to insert records that are routed to the source data store and the destination data store;
receive from the migration router and the additional migration router respective acknowledgments that the insert treatment configuration update has been applied at the migration router and the additional migration router; and
in response to receiving acknowledgments that the insert treatment configuration has been applied from all migration routers in a fleet of migration routers that includes the migration router and the additional migration router, instruct the migration router and the additional migration router to stop acquiring insertion locks for subsequently received requests to insert records.

3. The system of claim 2, wherein the migration router and the additional migration router are further configured to:
receive an instruction from the control plane to acquire locks for subsequently received requests to insert records;
complete any outstanding requests to insert records received before receiving the instruction to start acquiring locks;
acknowledge, subsequent to completing the outstanding requests to insert records, that the instruction to acquire locks for requests to insert records has been applied;
receive the insert treatment configuration update;
complete any outstanding requests to insert records received before receiving the insert treatment configuration update; and
acknowledge, subsequent to completing the outstanding requests to insert records using a previous insert treatment configuration, that the insert treatment configuration update has been applied.

4. The system of claim 2, wherein a lock record for the lock indicating that the additional individual record is being inserted at the determined location is stored in the lock store, and
wherein the additional migration router is configured to:
receive, from the client during the migration, another request to insert a record having a same key as the additional individual record;
determine, based on an insert treatment configuration stored by the additional migration router, a location to insert the record having the same key as the additional individual record, wherein the determined location is in the source data store or the destination data store;
attempt to acquire, from the lock store, a lock indicating that the record having the same key as the additional individual record is being inserted at the determined location determined by the additional migration router;
receive, from the lock store, a notification that the attempt to acquire the lock has failed, wherein the notification indicates the determined location determined by the migration router for the additional record that has the same key as the record requested to be inserted; and
insert the record having the same key as the additional individual record in the determined location as indicated in the notification from the lock store.

5. A method, comprising:
receiving, at a first migration router instance, from a client during a migration, a request to insert an individual record having an associated key, wherein the migration comprises a migration of a data set by one or more computing devices configured to implement a data migrator, wherein the data set comprises a plurality of records;
determining, based on an insert treatment configuration stored by the first migration router instance, a first determined location to insert the individual record;
acquiring, from a lock store, a lock indicating that the individual record is being inserted at the first determined location;
inserting the individual record in the first determined location;
receiving, at a second migration router instance, from the client or another client during the migration, a request to insert an additional individual record with a same associated key as the key associated with the individual record inserted by the first migration router instance;
determining, based on an insert treatment configuration stored by the second migration router instance, a second determined location to insert the additional individual record;
attempting to acquire, from the lock store, a lock indicating that the additional individual record is being inserted at the second determined location, determined by the second migration router instance;
receiving, from the lock store, a notification that the attempt to acquire the lock by the second migration router instance has failed, wherein the notification indicates the first determined location acquired by the first migration router instance; and
inserting the additional individual record with the same key in the first determined location as indicated in the notification from the lock store.

6. The method of claim 5, further comprising:
acquiring, by the data migrator, from the lock store, a lock indicating that a different individual record is being migrated from the source data store to the destination data store;
storing, by the data migrator, in the destination data store, an instance of the different individual record;
deleting, by the data migrator, in the source data store, a previously stored instance of the different individual record; and
deleting, by the data migrator, from the lock store, the lock indicating that the different individual record is being migrated from the source data store to the destination data store;
receiving, by the migration router, during the migration, from a client, an update request for the different individual record;
attempting, by the migration router, to acquire from the lock store a lock indicating that the different individual record is to be updated; and
receiving at the migration router, from the lock store, an indication that the attempt to acquire the lock has failed due to the lock for the different individual record already having been acquired by the data migrator.

7. The method of claim 6, further comprising:
receiving, from the client during the migration, an update request for another individual record;
attempting to read the other individual record from the source data store;
if the other individual record is found in the source data store, acquiring, from the lock store, a lock indicating that the other individual record is being updated, wherein the lock store is configured to deny an attempt to acquire a lock on the other individual record if the data migrator has already acquired a lock on the other individual record;
subsequent to acquiring the lock indicating the update, attempting to read the other individual record from the source data store and the destination data store;
if the other individual record is found in the destination data store, writing the update for the other individual record to the destination data store; or
if the other individual record is found in the source data store, writing the update for the other individual record to the source data store.

8. The method of claim 7, further comprising:
receiving, from the client during the migration, by one or more computing devices configured to implement an additional migration router, an update request for the other individual record;
attempting to acquire, by the additional migration router, from the lock store, a lock for the other individual record;
receiving, by the additional migration router, from the lock store a notification that the lock for the other individual record has already been acquired by the migration router, wherein the notification indicates a type of update operation being applied to the other individual record; and
performing the update on the individual record if a type of update of the update request and the indicated type of update associated with the lock are homogenous operations; or
refraining from performing the update on the individual record if the type of update of the modification request and the indicated type of update associated with the lock are heterogeneous operations.

9. The method of claim 8, wherein the homogenous operations comprise:
a first request to write to the other individual record and a second request to write to the other individual record; or
a first request to delete the other individual record and a second request to delete the other individual record; and
wherein the heterogeneous operations comprise:
a first request to write to the other individual record and a second request to delete the other individual record; or
a first request to delete the other individual record and a second request to write to the other individual record.

10. The method of claim 6, further comprising:
receiving, from the client during the migration, an update request for another individual record;
attempting to read the other individual record from the source data store and the destination data store;
if the other individual record is not found in the source data store and is found in the destination data store, writing the update for the other individual record to the destination data store without acquiring a lock for the update.

11. The method of claim 5, wherein the migration is between a source data store and a destination data store.

12. The method of claim 5, wherein the migration is between a first configuration of a data store and a second configuration of a data store, wherein the first and second configurations of the data store comprise a different number of nodes.

13. The method of claim 5, wherein the one or more computing devices configured to implement the data migrator, implement a plurality of data migrator instances, the method further comprising:
receiving, at the data migrator instances, an instruction from the control plane to change a direction of migration;
completing, by respective ones of the plurality of data migrator instances, any outstanding migration operations for individual records initiated before receiving the instruction to change the direction of the migration;
acknowledging, by the respective ones of the plurality of data migrator instances, subsequent to completing the outstanding migration operations, that the instruction to change the migration direction has been applied.

14. The method of claim 5, wherein the one or more computing devices configured to implement the data migrator, implement a plurality of data migrator instances, the method further comprising:
receiving an instruction at the control plane to change a direction of the migration to a reverse direction;
terminating a set of data migrator instances configured to perform the migration in a forward direction; and
implementing another set of data migrator instances configured to perform the migration in a reverse direction.

15. The method of claim 14, wherein the control plane indicates a migration direction to the migration router in response to implementing the change in the migration direction.

16. One or more non-transitory, computer-readable storage media, storing program instructions that when executed on or across one or more computing devices cause the one or more computing devices to implement a data migrator configured to:
initiate a migration of a data set from a source data store to a destination data store, wherein the data set comprises a plurality of records,
wherein for an individual record, the data migrator is configured to:
acquire, from a lock store, a lock indicating that the individual record is being migrated from the source data store to the destination data store;
store, in the destination data store, an instance of the individual record;
delete, in the source data store, a previously stored instance of the individual record; and
delete, from the lock store, the lock indicating that the individual record is being migrated from the source data store to the destination data store; and
wherein for another individual record, the data migrator is configured to:
attempt to acquire, from the lock store, a lock indicating that the other individual record is being migrated from the source data store to the destination data store;
receive, from the lock store, an indication that the attempt to acquire the lock has failed due to another lock for the other individual record already being acquired for a modification operation;

subsequent to the modification operation, acquire, from the lock store, the lock indicating that the other individual record is being migrated from the source data store to the destination data store;

store, in the destination data store, an instance of the other individual record;

delete, in the source data store, a previously stored instance of the other individual record; and delete, from the lock store, the lock indicating that the other individual record is being migrated from the source data store to the destination data store.

17. The one or more non-transitory computer readable media of claim 16, wherein the data migrator comprises a plurality of data migrator instances, and wherein the program instructions cause the data migrator to:

receive an instruction to change a direction of the migration to a reverse direction;

terminate a set of data migrator instances configured to perform the migration in a forward direction; and implement another set of data migrator instances configured to perform the migration in a reverse direction.

18. The one or more non-transitory computer readable media of claim 16, wherein the data migrator comprises a plurality of data migrator instances, and wherein the program instructions cause the data migrator to:

receive from a control plane, an instruction that a direction of the migration is to be reversed;

provide to each of the migrator instances an instruction to reverse the direction of the migration, wherein each of the migrator instances complete any outstanding migration operations for individual records initiated before receiving the instruction to change the direction of the migration before acknowledging receipt of the instruction;

refrain from initiating migration operations until each of the migration instances has acknowledged receipt of the instruction to reverse the migration direction; and in response to receiving acknowledgements from each of the migration instances that the instruction to reverse the migration direction has been received, resuming migration operations to migrate individual data records in the reversed migration direction.

19. The one or more non-transitory computer readable media of claim 16, wherein the lock store associates states with locks stored in the lock store, wherein supported states comprise one or more of:

a null state indicating that a lock has not been issued for the individual record;

a forward migration state indicating that a lock has been issued to a data migrator to migrate an individual record in a forward direction;

a reverse migration state indicating that a locks has been issued to a data migrator to migrate an individual record in a reverse direction;

an update state indicating that a lock has been issued to a migration router to perform a write on an individual record; or a delete state indicating that a lock has been issued to a migration router to delete an individual record.

20. The one or more non-transitory computer readable media of claim 16, wherein the data migrator is configured to:

initiate a migration of portions of another data set between nodes of a single data store, wherein the other data set comprises a plurality of records, wherein for an individual record of the other data set, the data migrator is configured to:

acquire, from the lock store, a lock indicating that the individual record is being migrated within the single data store;

store, in a destination node of the single data store, an instance of the individual record;

delete, from a source node in the single data store, a previously stored instance of the individual record; and delete, from the lock store, the lock indicating that the individual record is being migrated within the single data store.

\* \* \* \* \*